(12) United States Patent
Silvester

(10) Patent No.: US 7,254,708 B2
(45) Date of Patent: Aug. 7, 2007

(54) APPARATUS AND METHOD FOR WIRELESS DEVICE SET-UP AND AUTHENTICATION USING AUDIO AUTHENTICATION_INFORMATION

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 617 days.

(21) Appl. No.: 10/092,401

(22) Filed: Mar. 5, 2002

(65) Prior Publication Data

US 2003/0172271 A1  Sep. 11, 2003

(51) Int. Cl.
*H04L 9/00* (2006.01)
(52) U.S. Cl. .................. 713/170; 713/168; 713/185
(58) Field of Classification Search ........ 713/169–170; 379/88.01–88; 704/246; 455/563
See application file for complete search history.

(56) References Cited

U.S. PATENT DOCUMENTS

| | | | | |
|---|---|---|---|---|
| 4,653,097 A | * | 3/1987 | Watanabe et al. ........... | 704/272 |
| 5,465,401 A | * | 11/1995 | Thompson ................... | 455/558 |
| 5,636,464 A | * | 6/1997 | Ciluffo ....................... | 42/70.11 |
| 5,758,021 A | * | 5/1998 | Hackbarth ................... | 704/232 |
| 5,918,066 A | * | 6/1999 | Chuang-Sung et al. ........ | 710/2 |
| 6,192,255 B1 | * | 2/2001 | Lewis et al. ................. | 455/558 |
| 6,324,271 B1 | * | 11/2001 | Sawyer et al. .......... | 379/142.05 |
| 6,366,622 B1 | * | 4/2002 | Brown et al. ................ | 375/322 |
| 6,430,395 B2 | * | 8/2002 | Arazi et al. ................. | 455/41.2 |
| 6,601,029 B1 | * | 7/2003 | Pickering ..................... | 704/257 |
| 6,614,352 B2 | * | 9/2003 | Pellet et al. .............. | 340/573.1 |
| 6,633,761 B1 | * | 10/2003 | Singhal et al. ............... | 455/436 |
| 6,650,888 B1 | * | 11/2003 | Cook .......................... | 455/410 |
| 6,662,163 B1 | * | 12/2003 | Albayrak et al. ........... | 704/275 |
| 6,711,381 B1 | * | 3/2004 | Cook et al. ................. | 455/63.1 |
| 6,718,172 B1 | * | 4/2004 | Cook et al. .............. | 455/452.2 |
| 6,738,457 B1 | * | 5/2004 | Pickering et al. ......... | 379/88.16 |
| 6,766,160 B1 | * | 7/2004 | Lemilainen et al. ........ | 455/411 |
| 6,772,331 B1 | * | 8/2004 | Hind et al. .................. | 713/151 |
| 6,782,260 B2 | * | 8/2004 | Nakakita et al. .......... | 455/435.1 |
| 6,868,385 B1 | * | 3/2005 | Gerson ........................ | 704/275 |
| 6,882,973 B1 | * | 4/2005 | Pickering .................... | 704/270 |

(Continued)

OTHER PUBLICATIONS

Haartsen et al., Bluetooth—A New Low-Power Radio Interface Providing Short-Range Connectivity, Oct. 2000, IEEE, pp. 1651-1661.*

(Continued)

*Primary Examiner*—Nasser Moazzami
*Assistant Examiner*—David Garcia Cervetti
(74) *Attorney, Agent, or Firm*—Blakely, Sokoloff, Taylor & Zafman LLP

(57) ABSTRACT

An apparatus and method for wireless device set-up and authentication using voice stream identification information are described. The method includes the detection of a wireless device within communication range of a host device. Once detected, the device is authenticated according to requested device identification information. However, when authentication of the detected device fails, audio authentication initialization information is requested from the detected device. As a result, the detected device is authenticated based on the requested audio authentication initialization information. In one embodiment, the audio authentication initialization information refers to a voice stream device identification code assigned to the detected device during authentication set-up by a user of the detected device.

36 Claims, 17 Drawing Sheets

U.S. PATENT DOCUMENTS

| | | | |
|---|---|---|---|
| 6,937,977 B2* | 8/2005 | Gerson | 704/201 |
| 6,963,759 B1* | 11/2005 | Gerson | 455/563 |
| 6,978,127 B1* | 12/2005 | Bulthuis et al. | 455/412.1 |
| 6,999,721 B2 | 2/2006 | Ollis et al. | |
| 2001/0037197 A1* | 11/2001 | Boulanov | 704/231 |
| 2001/0044896 A1* | 11/2001 | Schwartz et al. | 713/169 |
| 2001/0052858 A1* | 12/2001 | Vincent et al. | 340/825.69 |
| 2001/0056349 A1* | 12/2001 | St. John | 704/270 |
| 2002/0077910 A1* | 6/2002 | Shioda et al. | 705/14 |
| 2002/0115044 A1* | 8/2002 | Shpiro | 434/156 |
| 2002/0129264 A1* | 9/2002 | Rowland et al. | 713/200 |
| 2002/0147653 A1* | 10/2002 | Shmueli et al. | 705/26 |
| 2003/0065918 A1* | 4/2003 | Willey | 713/168 |
| 2003/0069844 A1* | 4/2003 | Koren | 705/40 |
| 2003/0080869 A1* | 5/2003 | Pellet et al. | 340/573.1 |
| 2004/0025047 A1* | 2/2004 | Mayne et al. | 713/200 |
| 2004/0128519 A1* | 7/2004 | Klinger et al. | 713/186 |

OTHER PUBLICATIONS

Hubaux et al., The Quest for Security in Mobile Ad Hoc Networks, 2001, ACM, pp. 146-155.*

Sengodan et al., On end-to-end security for Bluetooth/WAP and TCP/IP networks, Dec. 2000, International Conference on Personal Wireless Communications, IEEE, pp. 399-403.*

Krishnamurthy et al., Security in Wireless Residential Networks, Feb. 2002, IEEE, pp. 157-166.*

Pei et al., Bluetooth—The Fastest Developing Wireless Technology, Aug. 2000, IEEE, pp. 1657-1664.*

Haartsen, J.C., The Bluetooth radio system, Personal Communications, IEEE, vol. 7, Issue 1, Feb. 2000 pp. 28-36.*

Sedov et al., Hardware Security Concept for Spontaneous Network Integration of Mobile Devices, Jun. 2001, Springer-Verlag, pp. 175-182.*

Bluetooth, Specification of the Bluetooth System, vol. 1, version 1.1, Feb. 22, 2001, pp. 148-233.*

Eustice et al., A Universal Information Appliance, IBM Systems Journal, vol. 38, No. 4, 1999.*

Harmer et al., 3G Products—what will the technology enable?, Jan. 2001, BT Technol J, vol. 19, No. 1.*

Olsen Jr. et al., Join and Capture: a model for nomadic interaction, Nov. 11, 2001, UIST 01.*

Zieniewicz et al., The Evolution of Army Earable Computers, Oct.-Dec. 2002, PERVASIVE Computing.*

U.S. Appl. No. 10/085,661, Office Action mailed Nov. 29, 2006.

* cited by examiner

APPARATUS AND METHOD FOR WIRELESS DEVICE SET-UP AND AUTHENTICATION USING AUDIO AUTHENTICATION_INFORMATION

FIELD OF THE INVENTION

The invention relates generally to the field of wireless devices. More particularly, the invention relates to a method and apparatus for wireless device set-up and authentication using voice stream identification information.

BACKGROUND OF THE INVENTION

The Bluetooth™ Radio System is designed according to a "Specification of the Bluetooth™ System", version 1.1, published Feb. 22, 2001 ("Bluetooth™ System Specification") as a wireless cable replacement solution based on radio frequency (RF) technology, with emphasis on robustness and low cost. Implementations of Bluetooth™ are based on high performance, yet low cost, integrat range required of these integrated radio transceivers is set to approximately 10 meters by the Bluetooth™ Radio System. In addition, the frequency assignment that is utilized by Bluetooth™ within the United States is within the same radio frequency range as 802.11 wireless LAN (local area network), high-end portable home telephones, medical devices, as well as microwave ovens.

Bluetooth™ is targeted at mobile and business users who need to establish a link or small network between their computers, cellular phones or other peripherals. In fact, a Bluetooth™ radio in a phone, PDA (personal digital assistant), headset, notebook computer or other device enables the various devices to communicate with each other. As a result, Bluetooth™ is gaining popularity as a wireless cable replacement technology. Moreover, Bluetooth™ provides a new market segment and devices to solve an age old problem of excessive number of wires for portable personal computers (PCs) and other mobile devices. Unfortunately, device initialization for Bluetooth™ enabled devices is accomplished via a very non-intuitive process.

Specifically, setting up a connection between a Bluetooth™ device (master) and a wireless device (slave) can be complicated and tedious. Conventional set-up mechanisms require the user to wade through a complicated set of procedures to enter device names and serial numbers in order to establish a connection between a slave device and a host device. As a result, identifying a slave device to a host device is a tedious and complicated task for the novice user. Likewise, setting up multiple devices to work with a host device can quickly become frustrating for even an advanced user. Therefore, there remains a need to overcome one or more of the limitations in the above-described existing art.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
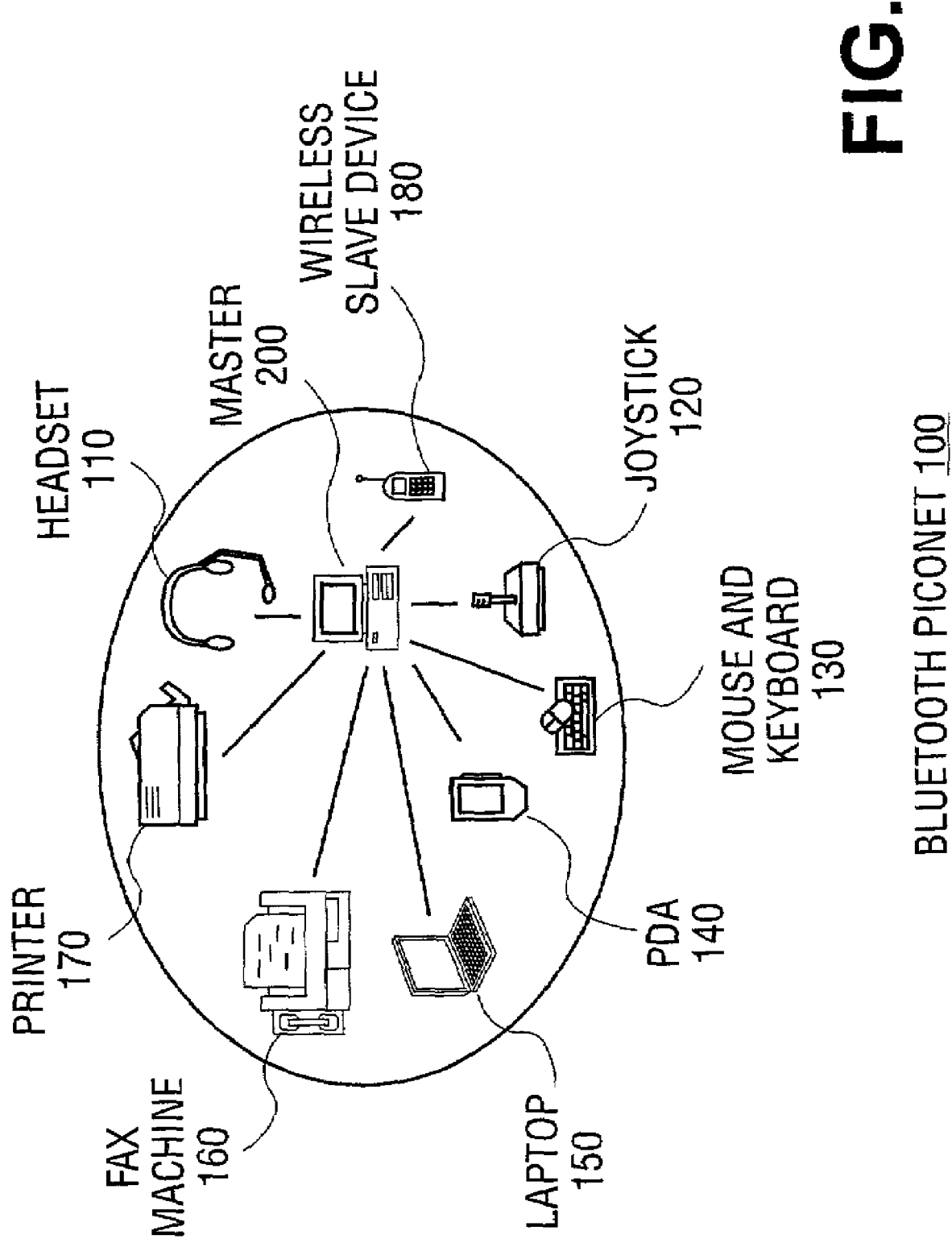
FIG. 1 depicts a block diagram illustrating a Bluetooth™ piconet utilizing a host computer configured to implement wireless device set-up and authentication using audio authentication information in accordance with one embodiment of the present invention.

A method and apparatus for wireless device set-up and authentication using voice stream identification information are described. In one embodiment, the method includes the detection of a wireless device within communication range of a host device. Once detected, the device is authenticated according to requested device identification information. However, when authentication of the detected device fails, audio authentication initialization information is requested from the detected device. As a result, the detected device is authenticated based on the requested audio authentication initialization information. In one embodiment, the audio authentication initialization information refers to a voice stream device identification code or an audio device name assigned to the detected device during authentication set-up by a user of the detected device.

In the following description, for the purposes of explanation, numerous specific details are set forth in order to provide a thorough understanding of the embodiments of the present invention. It will be apparent, however, to one skilled in the art that the embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the present invention. In other instances, well-known structures and devices are shown in block diagram form in order to avoid obscuring the details of the embodiments of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the embodiments herein, or it may prove convenient to construct more specialized apparatus to perform the required method. For example, any of the methods according to an embodiment of the present invention can be implemented in hard-wired circuitry, by programming a general-purpose processor, or by any combination of hardware and software.

One of skill in the art will immediately appreciate that an embodiment of the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. One embodiment of the invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of one embodiment of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the methods of one embodiment of the present invention. Alternatively, the methods of one embodiment of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, one embodiment of the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

Referring now to FIG. 1, FIG. 1 depicts a Bluetooth™ piconet 100, including a master, host computer 200, which utilizes audio device authentication information for device set-up, as well as device initialization and authentication. As known to those skilled in the art, a piconet describes a collection of devices connected via Bluetooth™ technology in an ad hoc fashion. A piconet is initialized with two connective device, such as for example, a portable personal computer and a mobile phone. The number of devices which can participate in a piconet is limited to eight units. Accordingly, as illustrated in FIG. 1, the various devices, including headset 110, joystick 120, mouse keyboard 130, personal digital assistant (PDA) 140, laptop computer 150, fax machine 160, printer 170 and wireless slave device 180 (illustrated as a cell phone), may participate in a piconet with a host computer 200.

As described above, piconets such as piconet 100, as depicted in FIG. 1, are designed as wire replacement technologies for implementing networks, such as illustrated in FIG. 1, without the need of wires for interconnecting devices. As such, a host computer 200 would merely await page requests from the various devices in order to establish a connection between the host computer and an authorized device, such as for example, wireless slave device 180. Unfortunately, the simple paging of devices in order to enter a piconet, such as depicted in FIG. 1, requires user intervention and device initialization in order to provide the security features necessary to prevent rogue activity within such network.

Conventional Bluetooth™ security is generally provided, both at the application layer and link layer. In order to provide Bluetooth™ security at the link layer, a public address, as well as a pair of secret keys and a random number are utilized by Bluetooth™ devices in order to authenticate the devices at each end of an established audio link. The Bluetooth™ device address ($BD_{13}$ ADDR) is a 48-bit IEEE (Institute of Electrical and Electronic Engineers) address, which is unique for each Bluetooth™ unit. Generally, the Bluetooth™ addresses are publicly known and can be obtained via man-machine interface (MMI) interaction or via an inquiry routine by a Bluetooth™ user.

The private keys described above for maintaining Bluetooth™ security are used for authentication, as well as encryption, while the random number generation is provided for each new transaction between a communicating pair of Bluetooth™ enabled devices. As such, security within Bluetooth™ devices is generally provided via a challenge response routine for authentication, wherein communicating devices are assumed to share a common authentication key (link key), which is a 128-bit random number that is generated by each device at installation of the Bluetooth™ unit. As such, various devices challenge respective communicating devices to verify knowledge of the stored link key.

However, the challenge response scheme described presupposes the storage of a link key, or authentication key, within each of the communicating devices. In order to store an authentication key within each communicating pair of devices, device initialization is required. During device initialization, an initialization key is derived from a random number, an L-Octel PIN (personal identification number) code and the Bluetooth™ device address. The PIN code, as well as the Bluetooth ™ device address, are generally provided, via MMI interaction, by the user.

As such, during initialization of a communications link between devices, the user is required to provide device identification information, as well as a PIN code. This information is utilized to generate an initialization key. Once the initialization key is generated, each of the devices will decide which device (slave) will provide its stored authentication key to the corresponding communicating Bluetooth™ device (master). Once this is decided, the devices can exchange the authentication key utilizing the initialization key for security. As a result, subsequent authentication between the devices is provided via the challenge response scheme described above, thereby illustrating knowledge of the previously exchanged authentication keys.

Unfortunately, the device initialization process must be repeated for each device that the user desires to interact within a piconet, such as depicted in FIG. 1. This process can become quite tedious and complicated for the users, as well as novice users. In other words, each device which the user wants to participate in a respective piconet will require entry of non-intuitive device identification numbers and PIN codes, which can become very time-consuming. When performed incorrectly, communication failures will result once the piconet is formed. Accordingly, one embodiment of the present invention describes an authentication system utilizing human voice personalized as a device identification code or device name for device authentication and initialization within the Bluetooth™ Radio System.

In one embodiment, a device user utilizes a microphone to enable the user to record a spoken device identification name, which is stored by the device as a voice stream device identification code (referred to herein as "audio device identification information"). This audio device identification information is utilized by software running on host devices and will function as a device initialization key (referred to herein as "authentication initialization information"). As such, during device initialization, the audio device identification information can be exchanged between devices. Once exchanged and verified, an authentication key of a slave device is stored within a host device to enable subsequent device authentication during link set-up. Accordingly, the authentication initialization process becomes the transfer and comparison of a small audio bit stream containing the user's own spoken device name or device identification code rather than forcing the user to enter a long series of numbers and letters that may not mean anything to the user.

Figure 2A:
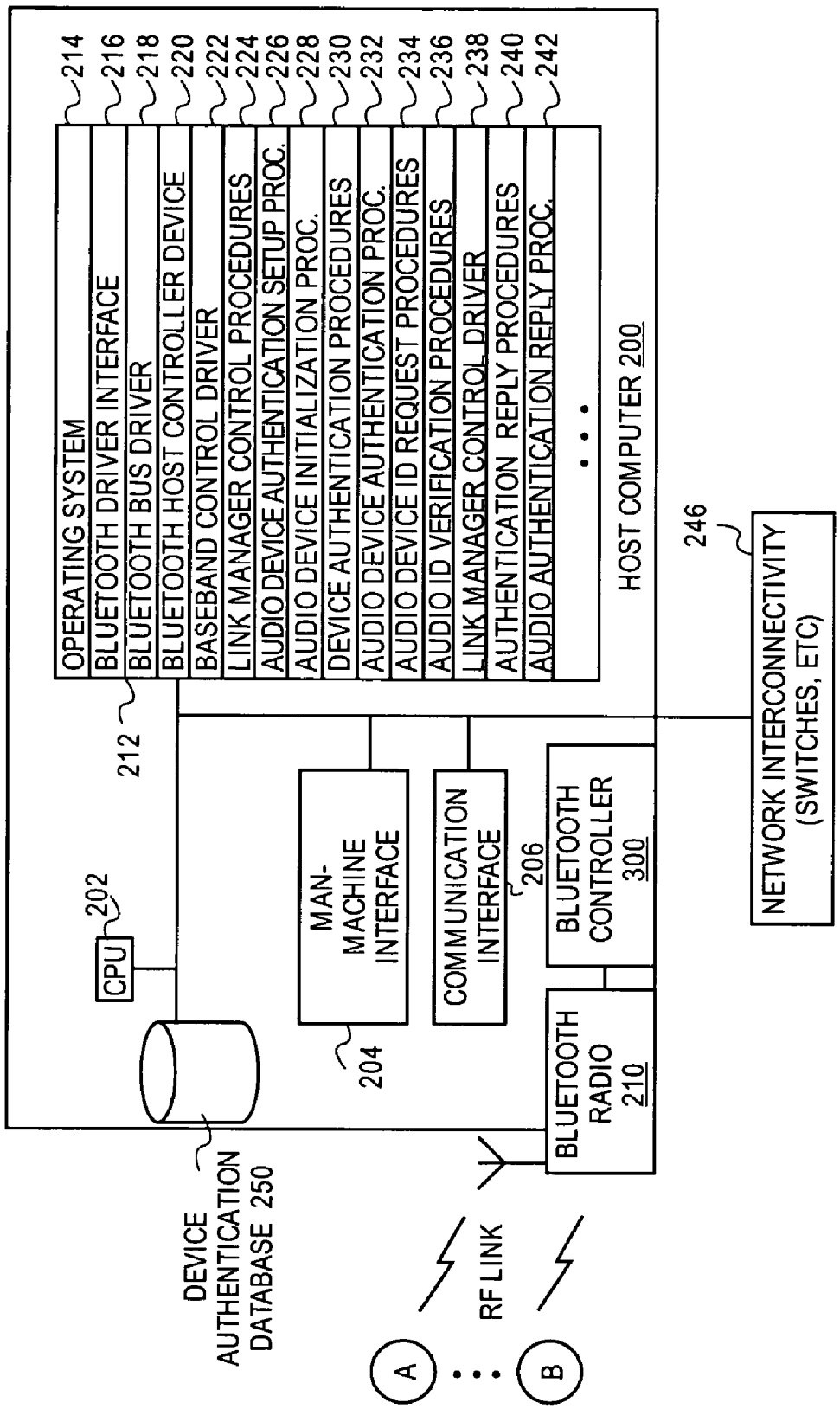
FIG. 2A depicts a block diagram further illustrating the host computer, as depicted in FIG. 1, in accordance with a further embodiment of the present invention.

Referring now to FIG. 2A, FIG. 2A further illustrates the host computer 200, as depicted in FIG. 1, in accordance with the further embodiment of the present invention. As depicted, the host computer 200 includes a CPU 202, a user interface 204, a communications interface 206, memory 212 as well as a network interconnectivity 246. However, the host computer 200 is implemented utilizing a Bluetooth™ controller 300, which performs device authentication initialization utilizing, in one embodiment, audio device identification information, as the authentication initialization information. In one embodiment, the audio device identification information can be utilized as both an initialization key, as well as an authentication key.

Figure 2B:
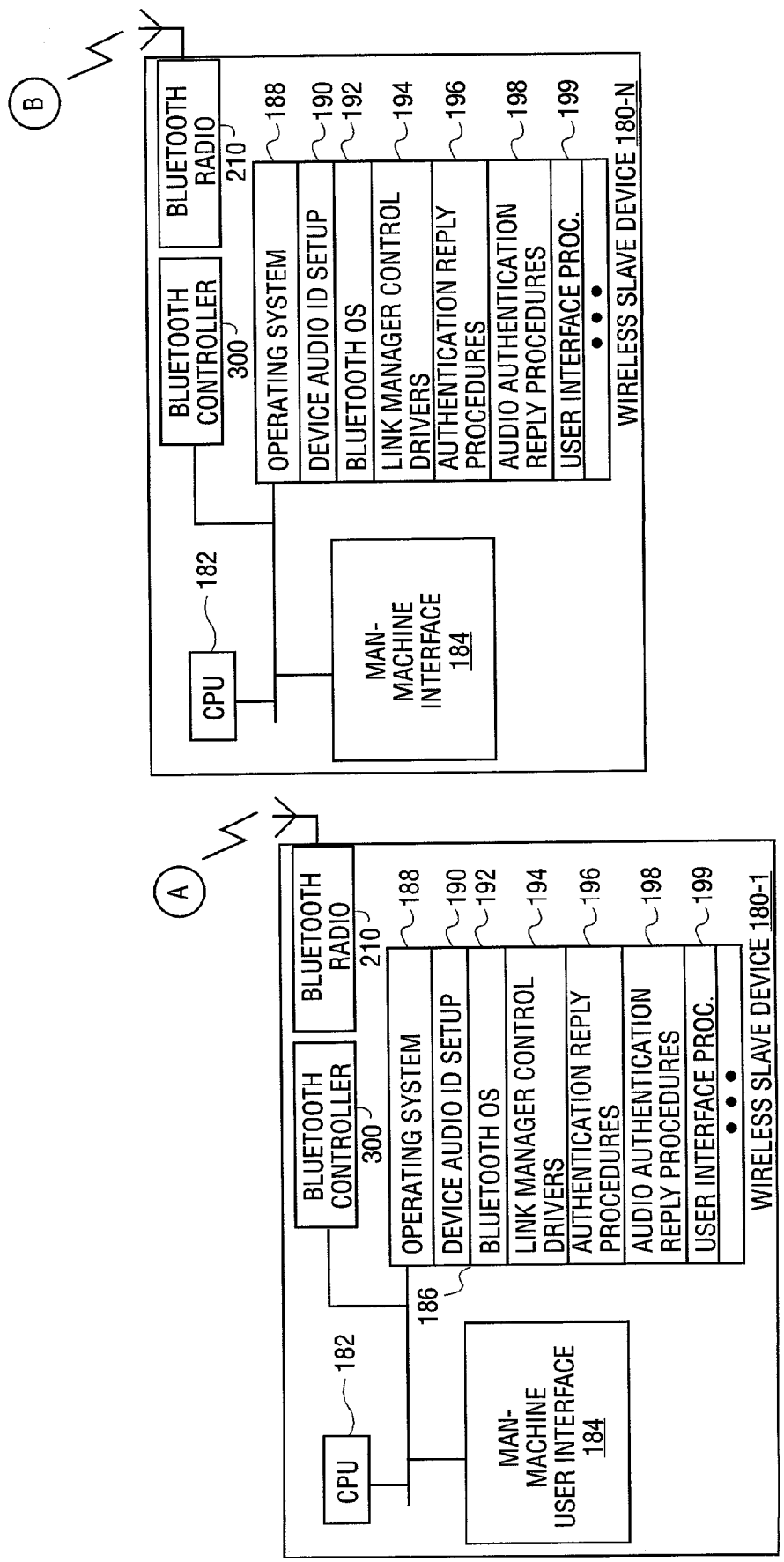
FIG. 2B depicts a block diagram further illustrating the wireless slave device, as illustrated in FIG. 1, in accordance with one embodiment of the present invention.

Although the host computer 200 is illustrated using the Bluetooth™ controller 300, those skilled in the art will recognize that each of the Bluetooth™ enabled devices, such as wireless slave devices 180 (180-1, . . . , 180-N), also include a Bluetooth™ controller 300 and Bluetooth™ radio 210, as depicted in FIG. 2B. Accordingly, the Bluetooth™ enabled slave devices 180 can be utilized by the host device in order to provide communication without the need for interconnected wires between the host computer and the Bluetooth™ enabled slave devices.

However, in contrast with conventional Bluetooth™ device authentication and initialization, the host device 200, as well as the wireless slave devices 180, as depicted in FIGS. 2A and 2B, utilize audio device identification information as the authentication initialization information in order to perform device initialization and subsequent storage of an authentication key, such as a link key, within each pair of communicating devices. As such, the subsequent device authentication can be carried out without the need for manual user entry of device identification and PIN numbers during conventional device initialization.

Referring again to FIG. 2A, the memory of the host computer 200 may be implemented as RAM (random access memory), SRAM (synchronous random access memory), SDRAM (synchronous data random access memory), flash memory or a combination of RAM and non-volatile memory, such as one or more memory modules, storage volumes or magnetic disk storage units. The memory can contain any of the following one or more of which are implemented with a Bluetooth™ software stack, as described in further detail below:

operating system 214, which includes for example, Windows driver model (WDM) drivers, such as the human interface device (HID) class driver, streaming media Windows drivers models, as well as network driver interface specifications supported by the operating system, such as for example, Winsock™ Transmission Control Protocol (TCP), Internet Protocol (IP) (TCP/IP);

Bluetooth™ driver interface 216;

Bluetooth™ bus driver 218;

Bluetooth™ host controller device 220;

baseband control driver 222;

link manager control procedures 224 configured to implement device authentication initialization utilizing audio device identification information as an initialization key stored within the device upon genesis boot of the Bluetooth™ enabled device and a host device during authentication set-up, the link manager control procedures collectively include procedures 226-242, described in further detail below;

audio device authentication set-up procedures 226 for enabling a user to speak the name or identification code assigned to a device and have the audio device identification information stored within a host device as an authentication initialization information (token) of the respective device, the audio device identification information is also stored within the wireless device during genesis boot of the device. In one embodiment, a user records a spoken, user assigned, device identification name within the host computer 200 during the audio device authentication set-up procedures in order to form an audio device authentication initialization token, such that audio device authentication initialization token replaces the initialization key used by conventional Bluetooth™ devices during initialization for secure exchange of a link (authentication) key to enable subsequent device authentication;

audio device initialization procedures 228 for requesting audio authentication initialization information from a detected wireless device and initializing an authentication (link) key utilizing the audio authentication initialization information for security; initialization procedures 228 are invoked by the device authentication procedures 230 when requested device identification information does not match stored device identification information;

device authentication procedures 230 which perform the conventional authentication procedures as required by the Bluetooth™ System Specification such that during link set-up between a slave device and a master device, the authentication reply procedures are invoked by the master device 200 during a challenge response scheme to identify a stored authentication key that is contained within both the wireless device and host device; when the authentication key has not been exchanged between the wireless device 180 and the host device 200, the host device will invoke the audio device initialization procedures 228, thereby requesting audio device identification information assigned to the wireless device by a user, as an authentication initialization key;

audio device authentication procedures 232 for performing device authentication using the audio device identification information assigned by a device user as both an initialization key as well as an authentication key;

audio device identification information (audio ID) request procedures 234 for requesting audio device identification information assigned to a device by a device user as audio authentication initialization information from during device authentication initialization;

audio device identification information (audio ID) verification procedures 236 for utilizing audio device identification information as audio authentication initialization information and comparing the audio authentication initialization information against one or more stored authentication initialization tokens within the device authentication database 250;

link manager control driver 238 configured to support audio authentication and initialization when requested of the host computer 200;

authentication reply procedures 240 for providing a requested device authentication (link) key in response to an authentication request and invoking the audio ID authentication replay procedures 242 in response to an authentication failure audio ID authentication reply procedures 242 for selecting a stored authentication initialization token in response to a request for authentication initialization from a master device following an authentication failure; and other procedures and files.

Referring now to FIG. 2B, FIG. 2B depicts a plurality of wireless slave devices 180, such as for example, wireless slave device 180 as depicted in the Bluetooth™ piconet 100 (FIG. 1). In the embodiment described, the wireless slave devices within the piconet modify the link manager control driver procedures in order to implement audio authentication initialization tokens as voice stream device identification codes in order to avoid user data entry of device ID codes and PIN codes during device initialization. As depicted, the wireless slave devices include a CPU 182, a man-machine interface 184, as well as a memory 186. However, the wireless slave devices 180 are implemented utilizing a Bluetooth™ controller 300 configured to enable audio authentication initialization utilizing voice stream device identification codes assigned to a user of a respective device during genesis boot of the respective device.

Referring again to FIG. 2B, the memory 186 of each wireless slave device may be implemented as RAM, SRAM, SDRAM, flash memory or a combination of RAM and non-volatile memory, such as one or more memory modules, storage volumes or magnetic disk storage units. The memory can contain any of the following one or more of which are implementations of a Bluetooth™ software stack, as described in further detail below:

an operating system 188;

audio device authentication set-up procedures 190, which prompt a user to provide a spoken device identification name or code (audio device identification information) during genesis boot of the device, which is stored in the flash memory, for example, of each device; as described in further detail below, the audio device identification information is compressed by the respective device and stored such that during device authentication initialization, the host device will provide the compressed audio device identification information to the host device as an authentication initialization token;

Bluetooth™ operating system 192 for implementing the various Bluetooth™ drivers and procedures in order to provide audio device authentication initialization as described herein;

link manager control driver procedures 194, which are modified utilizing procedures 196-199, as described in further detail below, in order to provide audio authentication initialization utilizing audio device identification information;

authentication reply procedures 196, which perform the conventional authentication procedures as required by the Bluetooth™ System Specification such that during initial communication between a slave device and a master device, the authentication reply procedures are invoked by the master device during a challenge response scheme to identify a stored authentication key that both the wireless device and host device contain a copy of; when the authentication key has not been exchanged between the wireless device 180 and the host device 200, the wireless device will invoke the audio ID authentication reply procedures 198, thereby providing a stored audio device identification name assigned to the wireless device by a user, as an authentication initialization key;

audio authentication reply procedures 198 for selecting a stored audio device identification information assigned to the wireless slave device 180 by a user of the device during genesis boot and provide the audio device identification name to the requesting host device;

user interface procedures 199 for requesting the user to speak the name or voice stream device identification code assigned to the device and transfer the audio device identification information to the requesting host device 200 as an initialization key; and other procedures and files.

In the embodiment described above, slave devices 180, according to the Bluetooth™ System Specification, generate an authentication key during genesis boot of the respective slave device 180. This authentication key, according to the Bluetooth™ System Specification, is to be exchanged between devices following authentication initialization by the devices. During authentication initialization, a slave device is required to generate an initialization key based on a PIN code and device identification information entered by the user via man-machine interface 184, along with a random number generated by the wireless slave device. This initialization key is stored by the host device and utilized to exchange the authentication key generated by the slave device at genesis boot to enable subsequent device authentication.

However, in order to avoid manual entry of device identification and PIN codes by the user, the user can avoid the data entry by simply speaking a device identification name or code (audio device identification information) which is stored by the wireless slave device during genesis boot as an initialization key which is referred to herein as a device authentication initialization information (token). In addition, the user stores the same name within the host device 200 such that the audio device identification information is used as a substitute for an initialization key or token, as referred to herein. As a result, during initial communication between the wireless slave device 180 and the host device 200, the wireless slave device initially provides its authentication key.

However, in contrast to conventional Bluetooth™ authentication initialization, when the authentication key is not shared by both the wireless slave device 180 and the host device 200, as determined via a challenge response scheme as described above, the procedures of the host device 200 will require the wireless slave device 180 to provide an authentication initialization token or key, which in the embodiments described is the audio device identification information. As a result, once the host device matches the audio device identification information with stored device authentication initialization information of the host device, initialization is complete and the authentication key initially provided by the wireless slave device is stored by the host device. As a result, subsequent challenge response schemes will simply illustrate knowledge of the stored authentication key.

Figure 3:
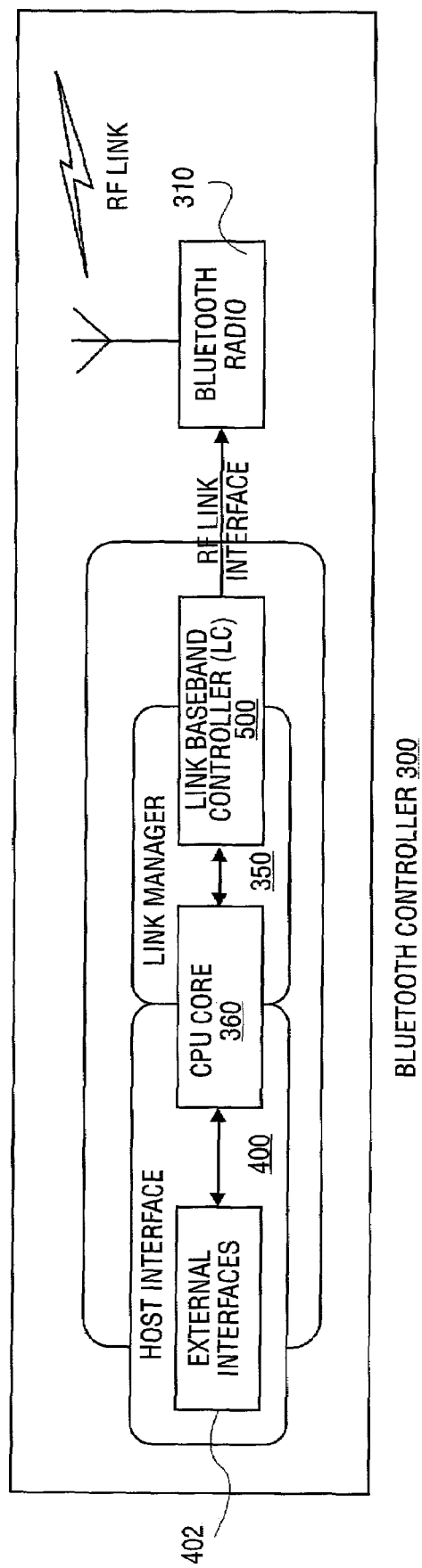
FIG. 3 depicts a block diagram illustrating the Bluetooth™ controller, as depicted in FIGS. 2A and 2B, in accordance with one embodiment of the present invention.

Referring now to FIG. 3, FIG. 3 further illustrates the Bluetooth™ controller 300, as depicted in FIGS. 2A and 2B, in accordance with a further embodiment of the present invention. As depicted, the Bluetooth™ controller 300 includes an analog portion as the Bluetooth™ radio 310, which is utilized to communicate with the various Bluetooth™ enabled devices, as well as the digital portion, the link controller (Bluetooth™ baseband controller) 500. Accordingly, the Bluetooth™ baseband controller 500 performs the digital signal processing functions of the Bluetooth™ controller 300 using various signal processing hardware. The Bluetooth™ controller 300 further includes a CPU (central processing unit) core 360, which is optional, but is however beneficial, in order to avoid interface problems with a personal computer CPU. The CPU core 360 is further utilized to interface between external interfaces 402, which provide a host interface 400 to the various additional devices of the host computer 200.

As such, the baseband controller 500 includes hardware for performing baseband processing and basic protocols close to the physical layer, such as for example, ARQ (automatic request repeat) protocol and FEC (forward error control) coding. Hence, the baseband controller 500 incorporates all hardware required to interface the Bluetooth™ controller 300 to the Bluetooth™ radio e data are transferred between Bluetooth™ units across the radio interface in packet format. In addition, the baseband controller 500 is generally responsible for quality of service parameters, asynchronous transfers with guaranteed delivery, synchronous transfers audio coding and encryption.

Referring again to FIG. 3, the link manager 350 is a software entity which carries out protocols, such as link set-up, device initialization, authentication, link configuration and the like. The link manager 350 discovers other remote link managers and communicates with them via the link management protocol (LMP) to perform service provider role and uses the services of the underlying baseband controller 500. The service provided includes name requests, which may be up to 16 characters in length, link address inquiries, connection set-up, authentication, link mode negotiation and set-up, such as for example, data or data invoice, setting devices in sniff mode, hold mode, park mode and active mode.

Figure 4:
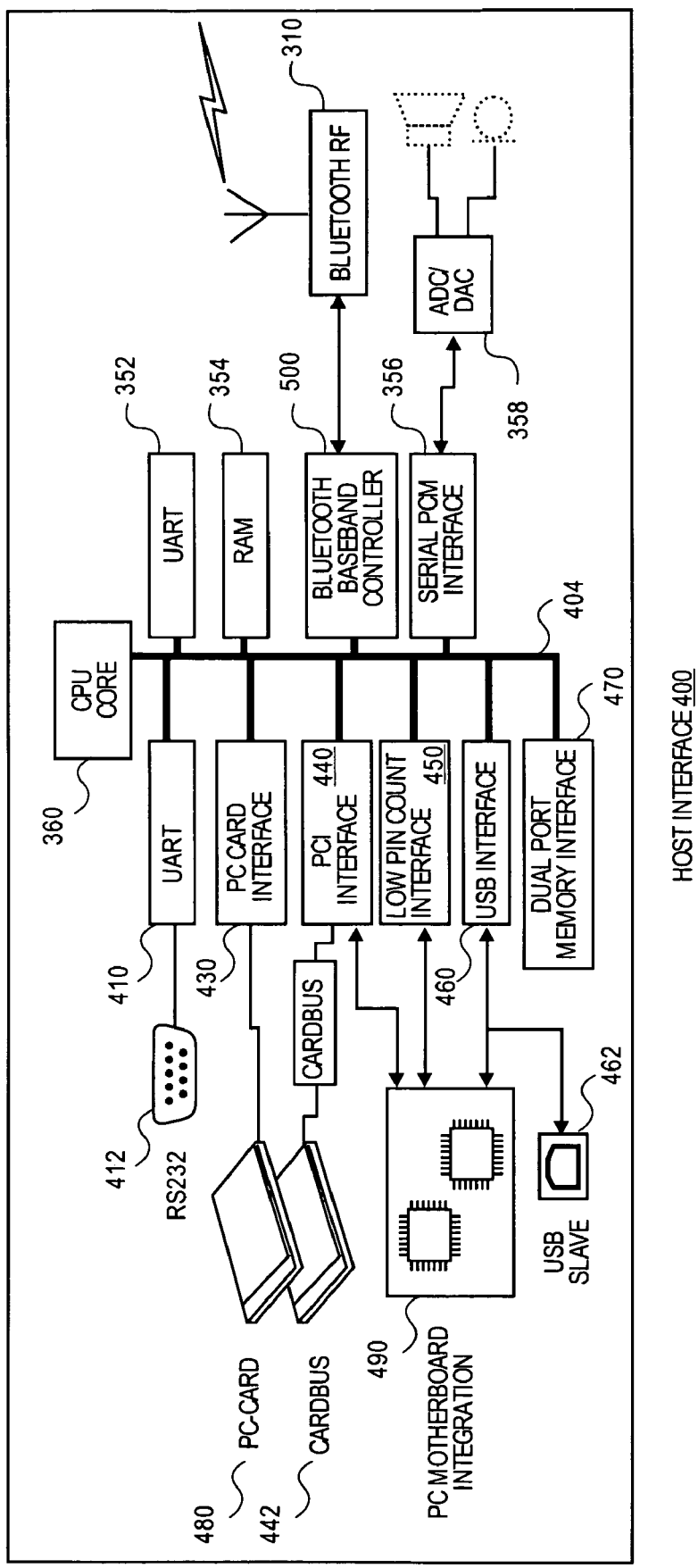
FIG. 4 depicts the host interface, as depicted in FIG. 3, in accordance with a further embodiment of the present invention.

Referring now to FIG. 4, FIG. 4 further illustrates link manager 350 and host interface 400, as depicted in FIG. 3, in accordance with one embodiment of the present invention. The host interface (HIF) 400 includes hardware and software, which interfaces the Bluetooth™ controller 300 to a host, such as for example, host device 200, as depicted in FIG. 2. The primary function of HIF 400 is to provide services of the lower layers (via the link manager) in a format suitable for the host device. Representatively, link manager 350 may include universal synchronous receiver/transmitter (UART) 352, random access memory (RAM) 354, serial PCM interface 356, which is coupled to analog-to-digital converter/digital-to-analog converter (ADC/DAC) 358. In the embodiment illustrated, UART 352, RAM 354 and serial pulse code modulation (PCM) interface 356 of link manager 350 are coupled to CPU core via bus 404.

Accordingly, the various external interfaces are depicted in FIG. 4, which may include for example, UART 410, PC card interface 430, PCI (peripheral component interconnect) interface 440, low pin out pin count interface 450, USB interface 460 and dual port memory interface 470. These devices may implement and support PC-card 480, card bus 442, RS232 connector 412, PC mother board integration 490, as well as USB slave 462. As such, the Bluetooth™ controller firmware implements the baseband link management protocol. The drivers control the radio 310 using the Bluetooth™ host controller interface 400, which is accessed through an appropriate transport interface, as described in further detail below.

Figure 5:
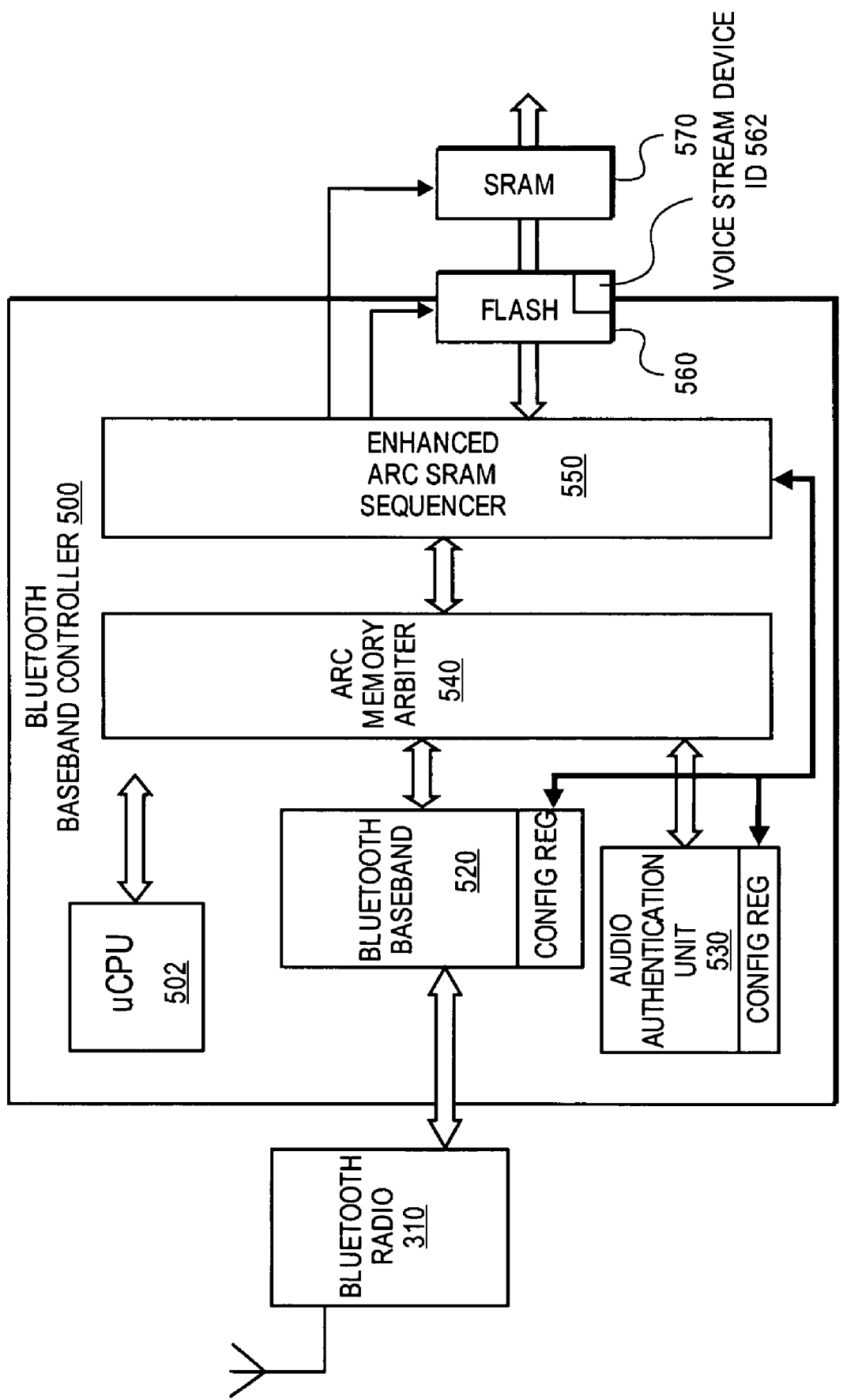
FIG. 5 depicts a block diagram further illustrating the Bluetooth™ baseband controller, as depicted in FIG. 3, in accordance with the further embodiment of the present invention.

Referring now to FIG. 5, FIG. 5 further illustrates the Bluetooth™ baseband controller, as depicted in FIG. 4. The Bluetooth™ baseband controller 500 includes a processor 360 along with memory arbiter 540, SRAM sequencer 550, flash memory 560 and SRAM 570. However, in contrast to conventional baseband controllers, the Bluetooth™ baseband controller 500 includes audio authentication unit 530, which baseband 520 utilizes in order to request audio (voice stream) device identification information (code) 562 assigned to the device by a user, and stored within, for example, flash memory 560. This audio device identification information replaces the initialization key utilized by Bluetooth™ security during first time audio link initialization. As a result, the user is not required to enter device ID codes and PIN numbers via MMI. Accordingly, the Bluetooth™ baseband 520 includes firmware for performing the audio device initialization and authentication functionality of link manager driver procedures, as depicted in FIGS. 2A and 2B, at the baseband level.

Accordingly, authentication unit 530 is utilized by the Bluetooth™ baseband controller 500 in order to perform authenticate initialization without the need for user entry of non-intuitive device ID codes and PIN numbers. In one embodiment, the audio device identification information is also utilized as an authentication key. Consequently, formation of piconets, as depicted in FIG. 1, simply requires assigning of audio device identification information to each device and storing the audio device name/code within each device and a host device, utilizing the authentication initialization procedures and authentication set-up procedures described above.

Software Architecture

The software architecture for implementing Bluetooth™ devices is based on the concept of treating the short range radio, such as for example, Bluetooth™ RF 310, as depicted in FIGS. 2-4, as a bus driver. Treating the local radio 310 as a bus controller enables the loading of appropriate device drivers on detection and identification of other Bluetooth™ compliant devices within range. As such, Bluetooth™ devices fall under the following three classes—telephone related devices, traditional PC peripherals and communication/network devices.

In order to support Bluetooth™ peripherals, the Bluetooth™ software model utilizes the windows driver model (WDMS) human interface (HID) class driver. The HID class driver comes standard from, for example, Microsoft's NT™ 5.0 and 98 operating systems, and provides support for all human interface devices, such as bus list mechanisms. The HID driver is capable of identifying the HID peripheral and loading the corresponding HID mini drivers in a way that is bus independent. The HID class driver must be pointed to a WDM bus driver. Accordingly, by means of the Bluetooth™ WDM bus driver and an HID to Bluetooth™ bus mini driver, the HID class driver can be used to support all human interface devices, such as mice, keyboard, joysticks or the like.

Support for real time voice has been implemented using digital audio hooks in the PC via the streaming media Windows driver model (WDM) defined by Microsoft Corporation of Redmond, Washington. In addition, the network driver interface specification has connection orientation channels at the (NDIS) layer, which targets telephone applications. Finally, in networking applications are implemented by utilizing the Bluetooth™ controller interface as a network interface card (NIC), utilizing a mini driver to interface the NDIS class driver with the Bluetooth™ WDM bus driver.

Figure 6:
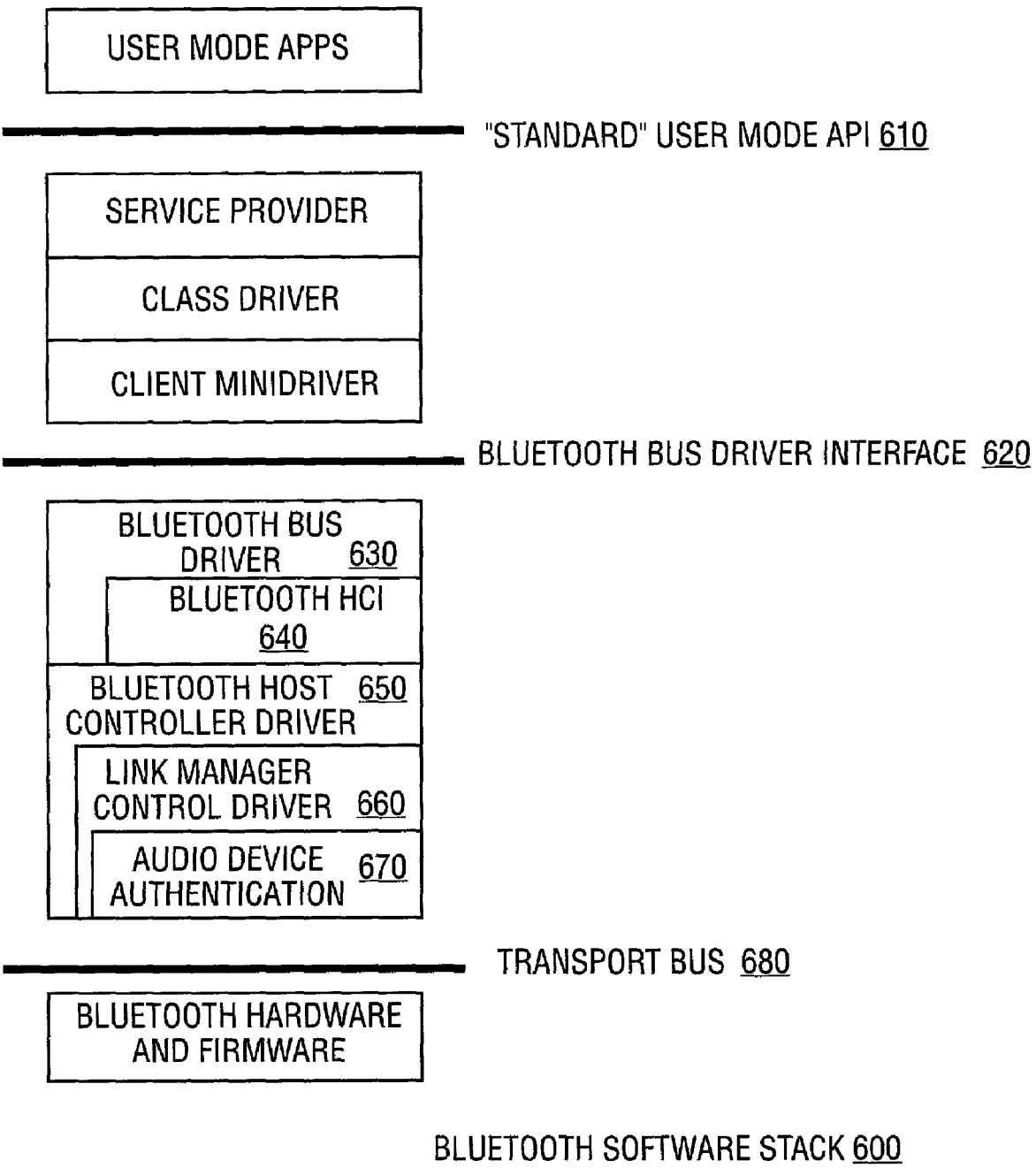
FIG. 6 depicts a Bluetooth™ software stack implementing a Bluetooth™ link manager control driver to provide wireless device set-audio authentication information in accordance with the further embodiment of the present invention.

Referring now to FIG. 6, FIG. 6 depicts the Bluetooth™ software stack 600. Representatively, Bluetooth™ software stack 600 includes standard user mode application programming interface (API) 610, Bluetooth™ bus driver interface 620 and transport bus interface 680. As illustrated, the core of the Bluetooth™ software stack 600 essentially includes the Bluetooth™ bus driver 630, the Bluetooth™ host control interface (HCI) 640 and the Bluetooth™ host controller driver 650. Accordingly, each function class typically includes a client driver that is loaded by the Bluetooth™ bus driver. These client drivers utilize the Bluetooth™ bus driver interface 620 to communicate with the Bluetooth™ bus driver 630 for data and control transfer purposes.

However, in contrast to conventional Bluetooth™ software stacks, Bluetooth™ software stack 600 includes a Bluetooth™ or link manager control driver 660, which is utilized to implement the audio device authentication initialization 670, as described herein. However, those skilled in the art will recognize that the audio authentication methods described herein may be implemented anywhere within the Bluetooth™ bus driver interface 620 software stack 600, as well as within the Bluetooth™ controller firmware, depending on the desired implementation specific details of the system designer.

Accordingly, as illustrated in FIGS. 2A and 2B, within the memory of the host device 200 and wireless slave devices, the link manager control driver procedures 222 enable the audio device authentication set-up and authentication initialization, as referred to above, within Bluetooth™ enabled devices. As such, the audio device authentication set-up procedures and audio device authentication procedures are utilized by the link manager control driver procedures in order to determine audio device identification information and perform authentication initialization using the audio device names/codes. Once performed, authentication keys are exchanged and device authentication is carried out via a challenge response scheme as described above. Procedural methods for implementing embodiments of the present invention are now described.

Operation

Figure 7:
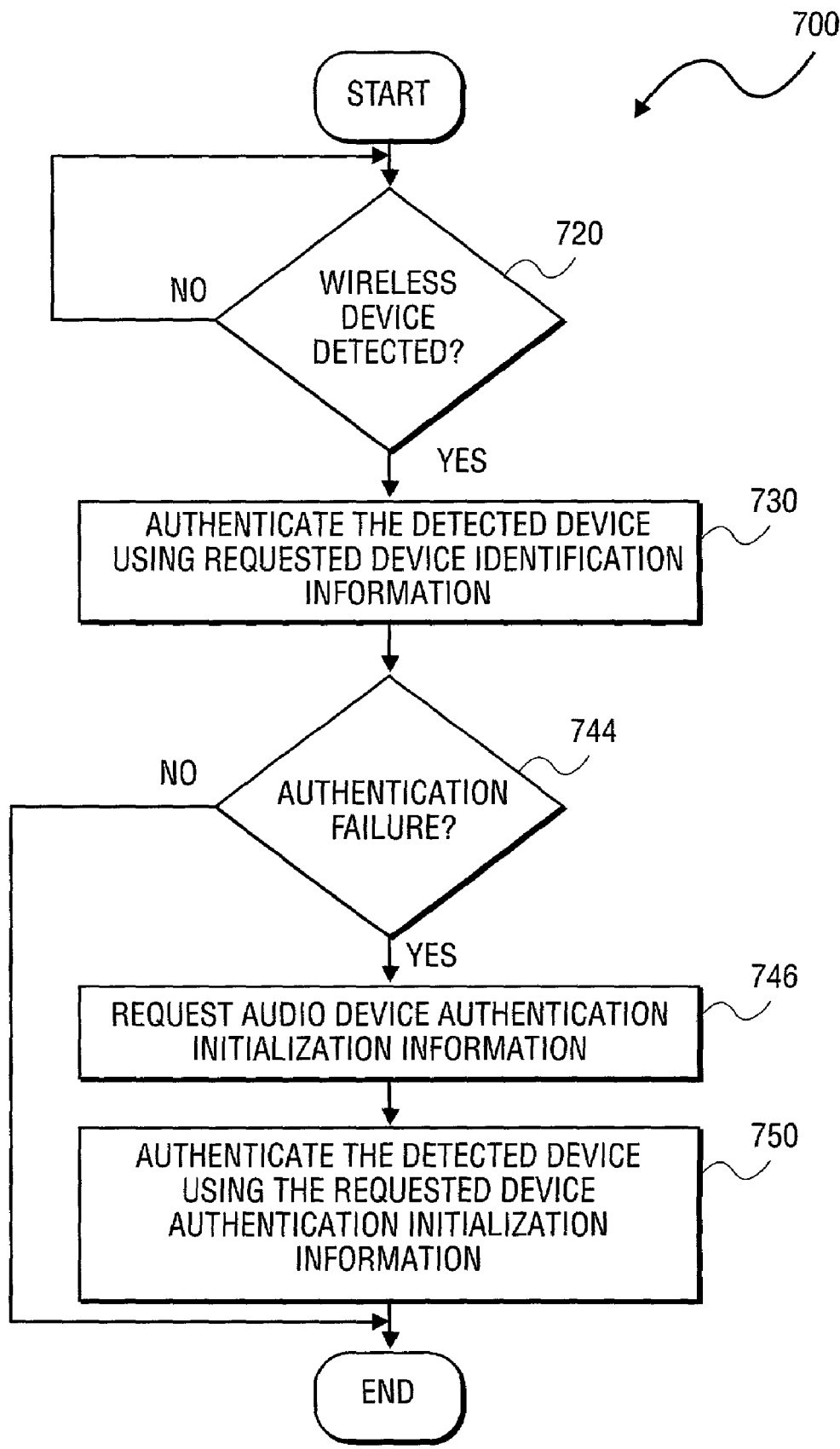
FIG. 7 depicts a flowchart illustrating a method for implementing wireless device authentication initialization utilizing audio device authentication initialization information in accordance with one embodiment of the present invention.

Referring now to FIG. 7, FIG. 7 depicts a method 700 for performing wireless device authentication initialization utilizing audio device authentication initialization information within a piconet, such as depicted in FIG. 1, utilizing wireless slave devices 180 and host device 200, as depicted in FIGS. 2A and 2B in accordance with one embodiment of the present invention. Accordingly, in one embodiment, the user is required to assign audio device identification information (audio device name/code) to a wireless slave device. Once assigned, the user is then required to provide the assigned audio device name/code to a host device, which will be communicating with the respective wireless slave device.

This process, as described above, is utilized in order to achieve authentication initialization, as required by the Bluetooth™ System Specification. As described above, authentication initialization is generally performed during initial link set-up between a pair of devices, wherein an initialization key is generated by a slave device utilizing a PIN code, a device ID, a PIN code length and a random number. This process generally requires user entry, via a device MMI, of a device ID code and PIN number, which is often a very non-intuitive process for a user and must be repeated for each device that is to participate in a piconet.

However, in accordance with one embodiment of the present invention, the assigned audio device identification information is used as the initialization key. Consequently, during authentication at initial creation of an audio link between devices, a challenge response scheme will determine that an authentication key is not stored by both a slave device and host device. As such, procedures described above within the host device will request an audio device authentication initialization token from the wireless slave device in order to perform authentication initialization and link key exchange.

In one embodiment, the device user assigns a spoken (audio) device name or code to the slave device. Once assigned, the user provides the audio device name/code to the host device which is stored as an initialization key. Due to the user's entry of this audio device name/code within the host device, a matching host initialization key is detected during authenticated initialization, at which time authentication keys are exchanged between the various devices. Consequently, future challenge response schemes and authentication as described by the Bluetooth™ System Specification are performed using the authentication keys. Accordingly, as described in detail below, FIGS. 7-14 describe link manager control procedures of host computer 200, while FIGS. 15-19 describe link manager control procedures 194-199, as performed by the wireless slave devices 180 in response to audio authentication initialization requests.

Referring again to FIG. 7, at process block 720, it is determined whether a wireless device 180 is detected by a host device 200. Once a device 180 is detected, at process block 730, the host device 200 will authenticate the detected device 180 using requested device identification information. In one embodiment, this is performed by using the device authentication procedures 230, which will request an authentication key from the detected wireless device. As described above, this may be performed via a challenge response scheme wherein the detected device 180 is required to illustrate knowledge of an authentication key stored within the host device 200.

Next, at process block 744, it is determined whether an authentication failure has occurred. The authentication failure will occur when the detected device fails to illustrate knowledge of a stored authentication key. This generally will be the case during a first time audio link set-up between the various devices. As such, at process block 746, the host device will request audio device authentication initialization information from the protected wireless device. In one embodiment, this is performed utilizing the device audio ID request procedures 232.

As such, process block 746 replaces the device initialization procedures described by the Bluetooth™ System Specification such that the audio device authentication initialization information replaces initialization keys generated during device initialization. Consequently, the user is only required to enter an audio device name/code assigned to a wireless device, which is stored in both the host device 200 and wireless device utilizing audio device authentication set-up procedures 226 and audio device initialization procedures 228. Accordingly, at process block 750, the host device authenticates the detected device using the requested device authentication initialization information.

In one embodiment, the authentication initialization information refers to a spoken or voice stream (audio) device name or identification code (identification information) assigned by the user to a wireless device during genesis boot of the wireless device 180. Once assigned, the user is required, via for example, audio device authentication set-up procedures 226 to provide the audio device identification information to the host device 200. As such, the host device 200 will store the audio device identification information, as an initialization key. Consequently, during first time communication between the wireless slave device 180 and the host device 200, the audio device identification information is utilized as an initialization key, such that once verified, an authentication key generated by the slave device 180 is provided to the host device 200 to enable subsequent authentication procedures in accordance with the Bluetooth™ System Specification.

Figure 8:
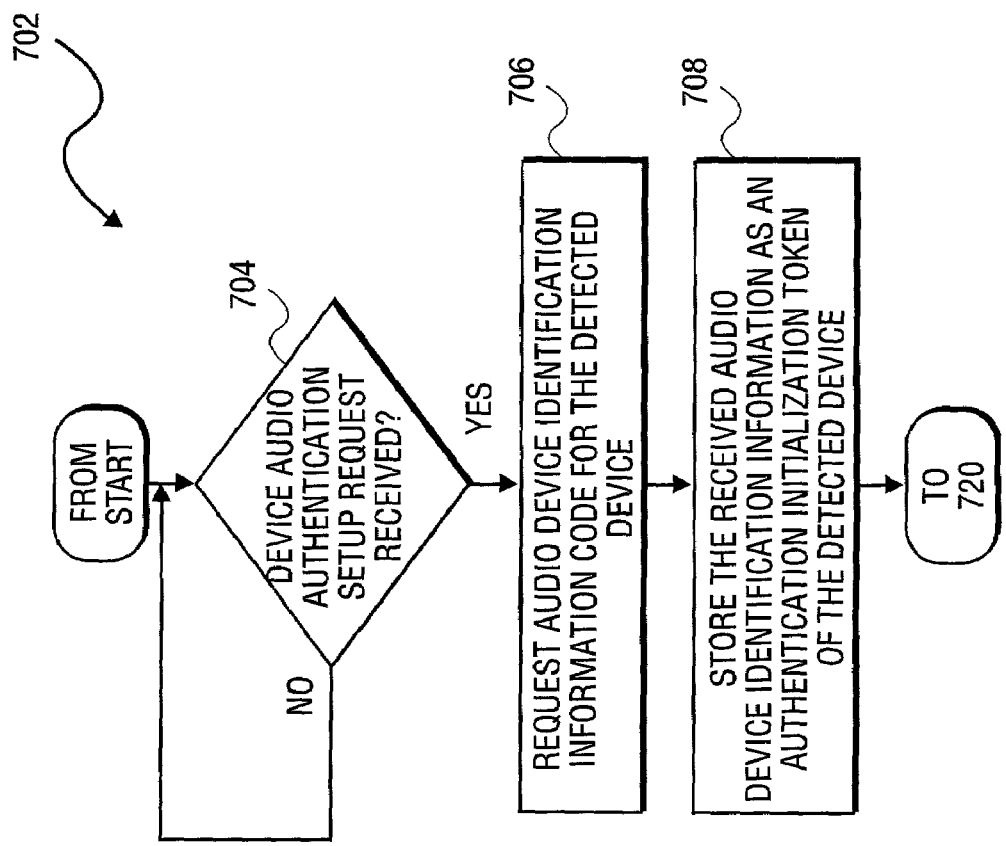
FIG. 8 depicts a flowchart illustrating a method for implementing wireless device authentication set-up utilizing voice stream device identification codes in accordance with a further embodiment of the present invention.

Referring now to FIG. 8, FIG. 8 depicts a method 702 for device authentication set-up utilizing, for example, audio device authentication set-up procedures 226. At process block 704, it is determined whether a device audio authentication set-up request is received from a user of a wireless device 180. As described in further detail below, such a request is received from a user following genesis boot of a wireless device, wherein audio device identification information (spoken device name or identification code) is assigned to the device 180. Once such a request is received, at process block 706, the host device 200 will request audio device identification information for the detected device. Once received, the audio device identification information is stored as an authentication initialization token of the detected device 180. Accordingly, the audio device identification information is utilized during device initialization in order to avoid user interaction for entry of device ID codes and PIN numbers required to form an initialization key.

Figure 9:
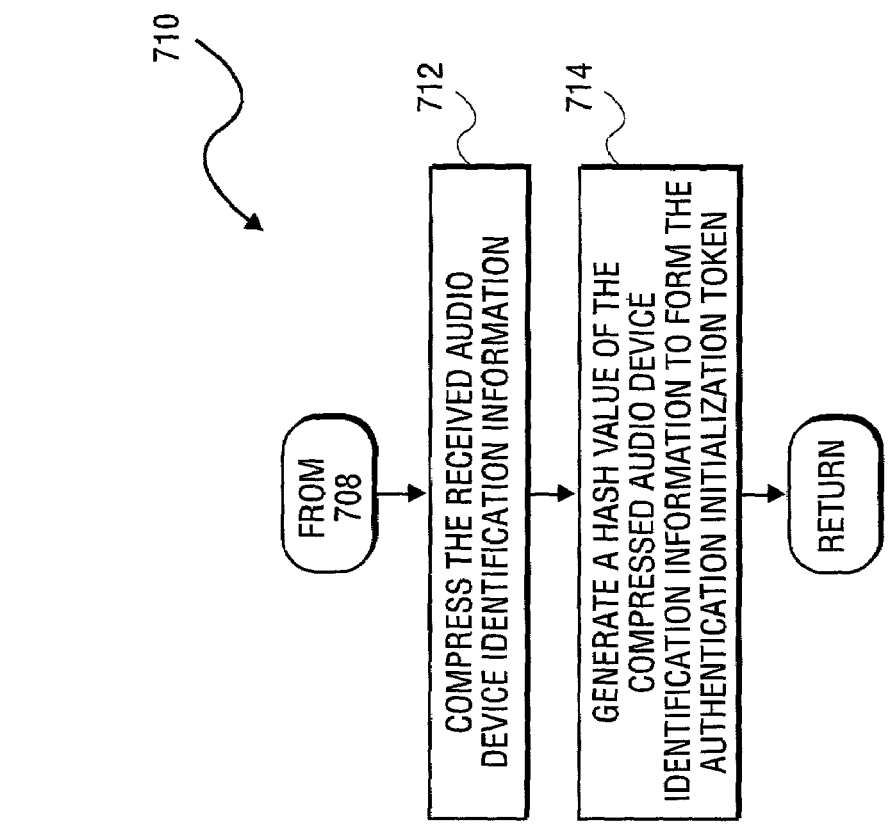
FIG. 9 depicts a flowchart illustrating a method for storing a received voice stream device identification code in accordance with a further embodiment of the present invention.

Referring now to FIG. 9, FIG. 9 depicts an additional method 710 for storing a received audio device identification information of process block 708, as depicted in FIG. 8. At process block 712, the received audio device identification information is compressed. Once compression is complete, at process block 714, the host device 200 generates a hash value of the compressed audio device identification information to form the authentication initialization token of the device 180. As such, in the embodiment described, the hash value of the stored authentication initialization token will be compared with the hash value of the received authentication initialization token in order to determine whether matching audio device identification information is detected in order to complete device authentication initialization.

Figure 10:
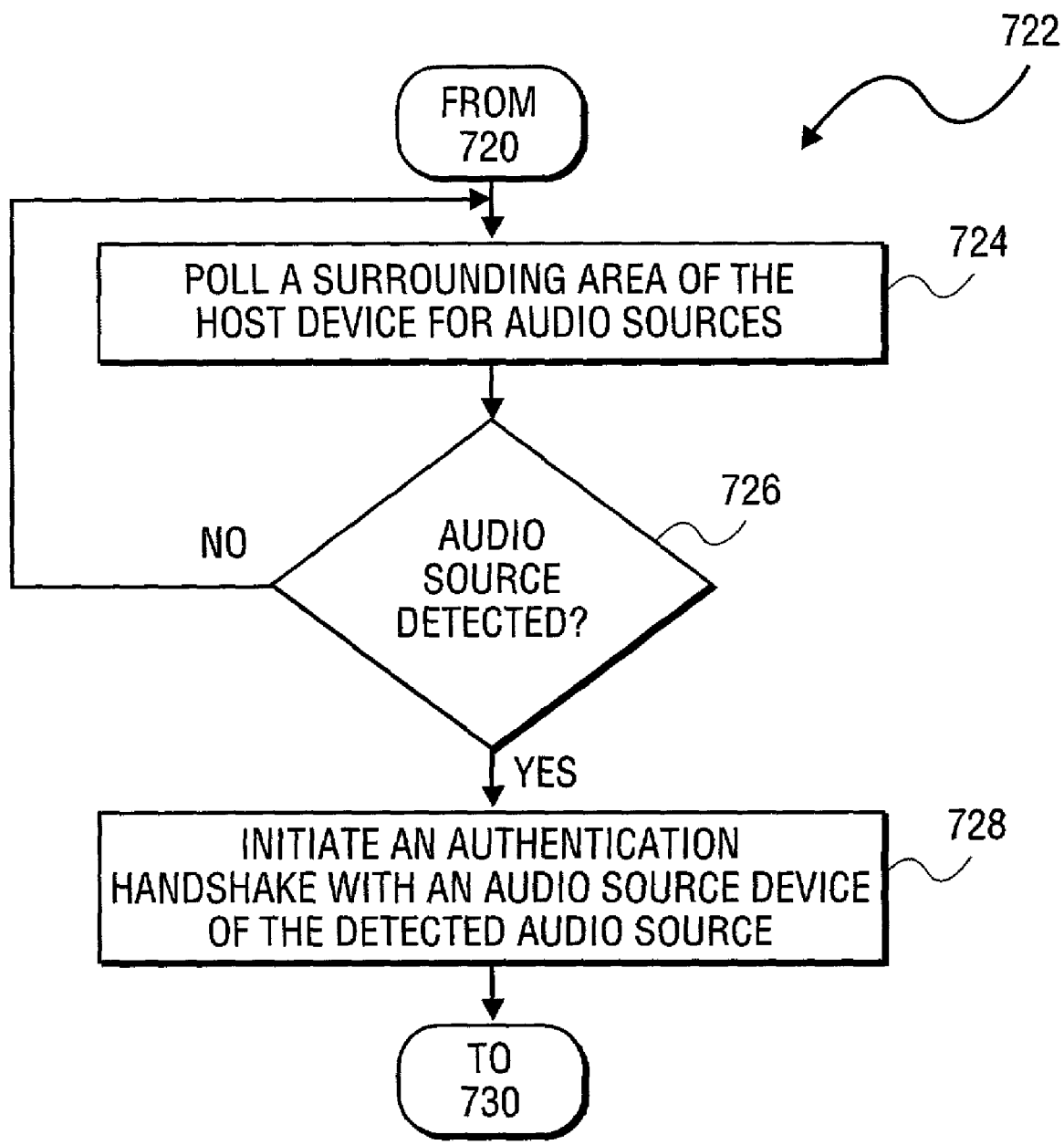
FIG. 10 depicts a flowchart illustrating an additional method for detecting a wireless device in accordance with a further embodiment of the present invention.

Referring now to FIG. 10, FIG. 10 depicts an additional method 722 for detecting a wireless device of process block 720, as depicted in FIG. 7. At process block 724, the host device 200 polls a surrounding area for audio source devices. Next, at process block 726, it is determined whether an audio source is detected. Once detected, at process block 728, the host device initiates an authentication handshake with an audio source device of the detected audio source. In one embodiment, this is performed by invoking the device authentication procedures 230.

As described above, when an authentication key is not shared between the host device 200 and the detected wire device 180 due to a first time communications connection, procedures 230 will invoke the audio device initialization procedures 228 in order to utilize audio device identification information as an authentication initialization key and exchange authentication keys between the devices. In one embodiment, the authentication keys are generated according to the Bluetooth™ System Specification, utilizing the random number generator and Bluetooth™ device address associated with the detected wireless device 180. However, in alternate embodiments, the devices may merely exchange device ID codes and PIN numbers as the authentication key.

Figure 11:
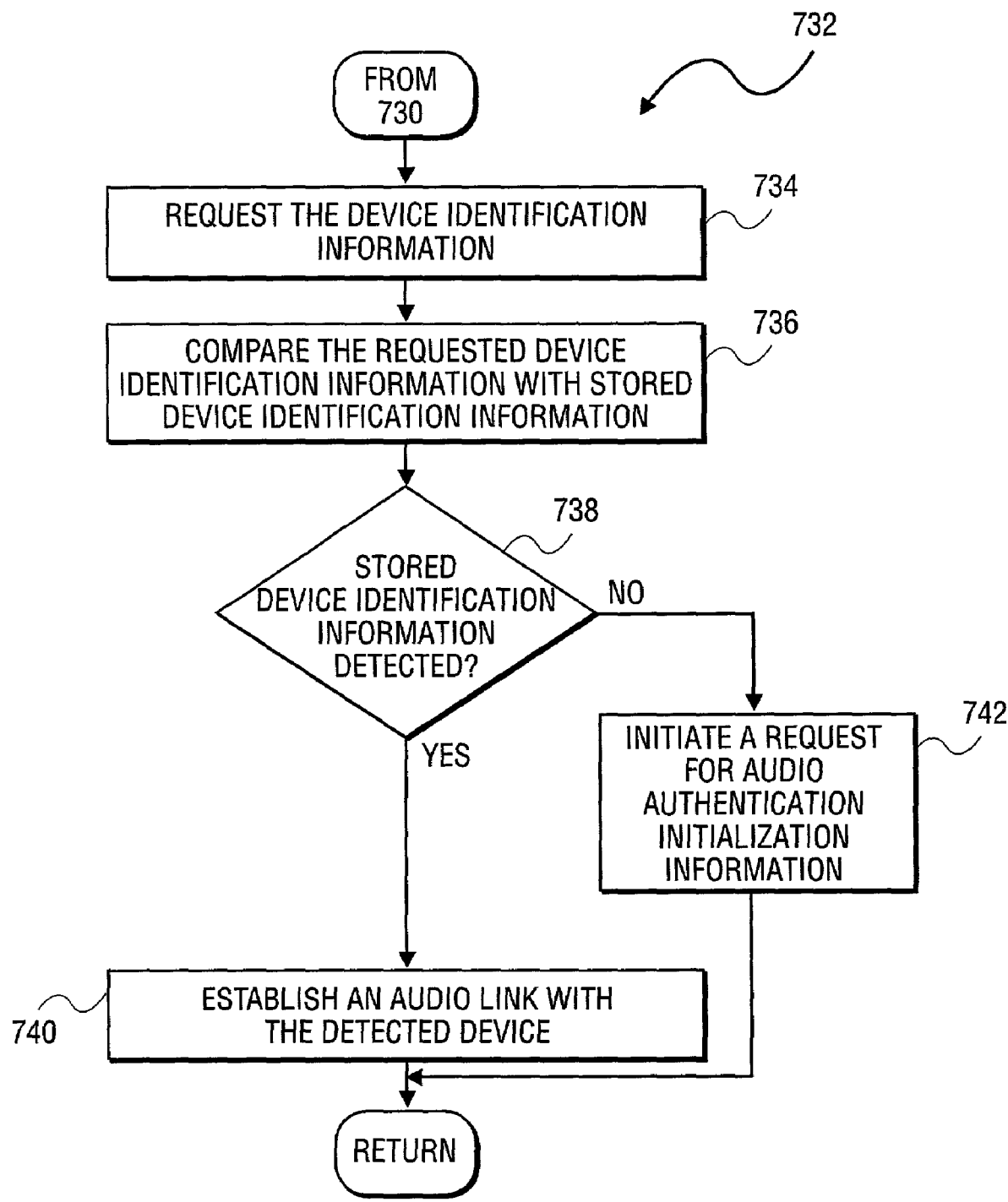
FIG. 11 depicts a flowchart illustrating an additional method for authenticating a device using requested device identification information in accordance with a further embodiment of the present invention.

Referring now to FIG. 11, FIG. 11 depicts an additional method 732 for authenticating the detected device using requested device identification information of process block 730, as depicted in FIG. 7. At process block 734, the host device 200 requests the device identification information from the detected wireless device 180. Once requested, at process block 736, the requested device identification information is compared with stored device identification information. In one embodiment, this is performed utilizing the device authentication procedures 230 such that an authentication key is received from the detected wireless device and compared with the stored authentication keys within the host device 200. At process block 738, it is determined whether stored device identification information matches the requested device identification information. When a match is found, at process block 740, the host device establishes an audio link with the detected device. Otherwise, at process block 732, the host device initiates a request for audio authentication initialization information. In one embodiment, process block 742 is performed by initiating the audio device initialization procedures 228.

Figure 12:
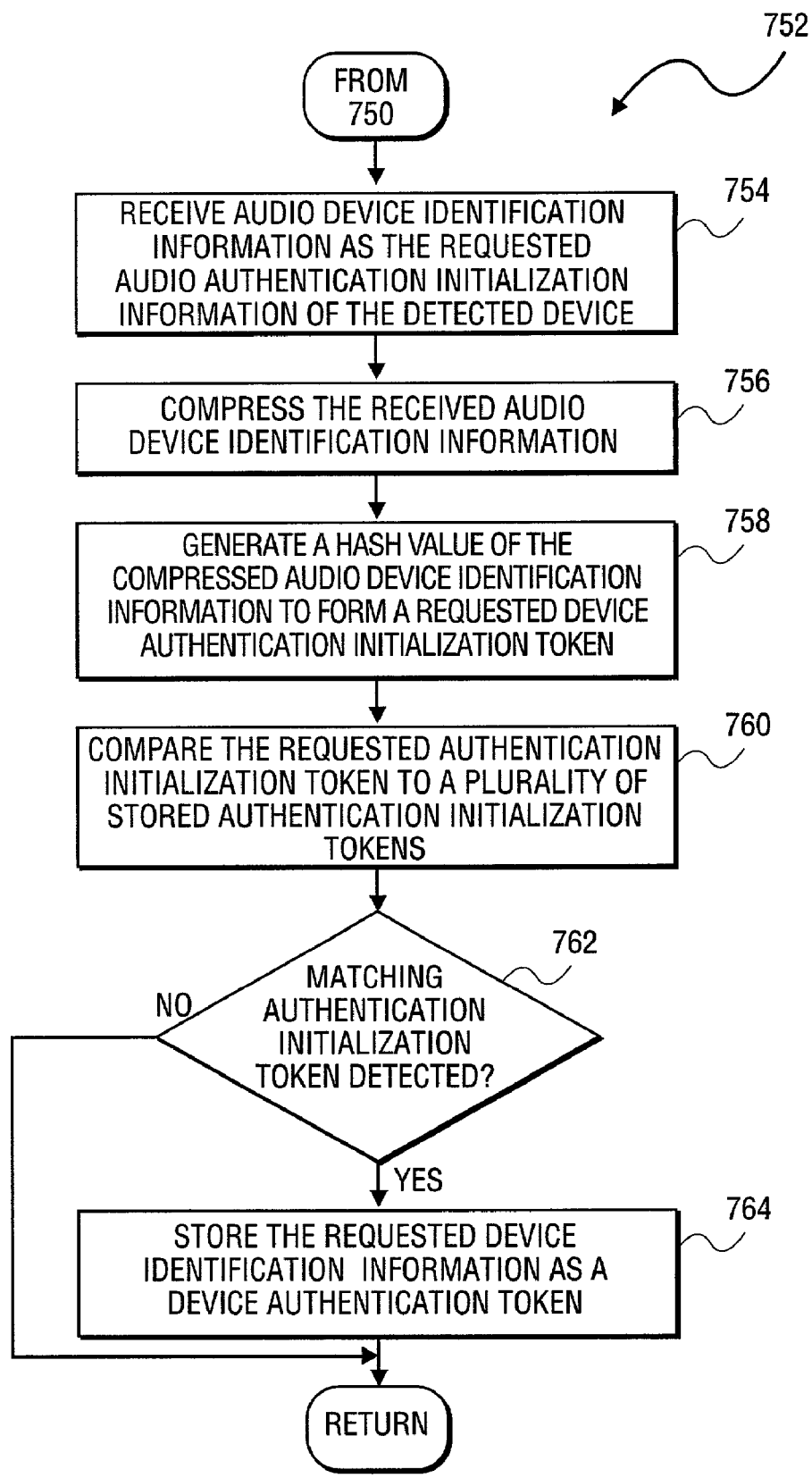
FIG. 12 depicts a flowchart illustrating an additional method for authenticating a detected device using requested device authentication initialization information in accordance with an exemplary embodiment of the present invention.

Referring now to FIG. 12, FIG. 12 depicts an additional method 752 for authenticating the detected device using the requested device authentication initialization information of process block 750, as depicted in FIG. 7. At process block 754, the host device receives audio device identification information as the requested audio authentication initialization information of the detected device. Once received, the host computer compresses the received audio device identification information at process block 756. At process block 758, a hash value of the compressed audio device identification information is generated in order to form a requested device authentication initialization token.

Next, at process block 760, the host device compares the requested device authentication initialization token against one or more stored authentication initialization tokens. At process block 762, it is determined whether a matching authentication initialization token is detected. When such is the case, at process block 764, the host device 200 stores the requested device identification information as a device authentication token of the detected wireless device 180. In one embodiment, the device identification information refers to an authentication key generated by the wireless device during genesis boot of the wireless device based on the device's address, as well as a random number.

Figure 13:
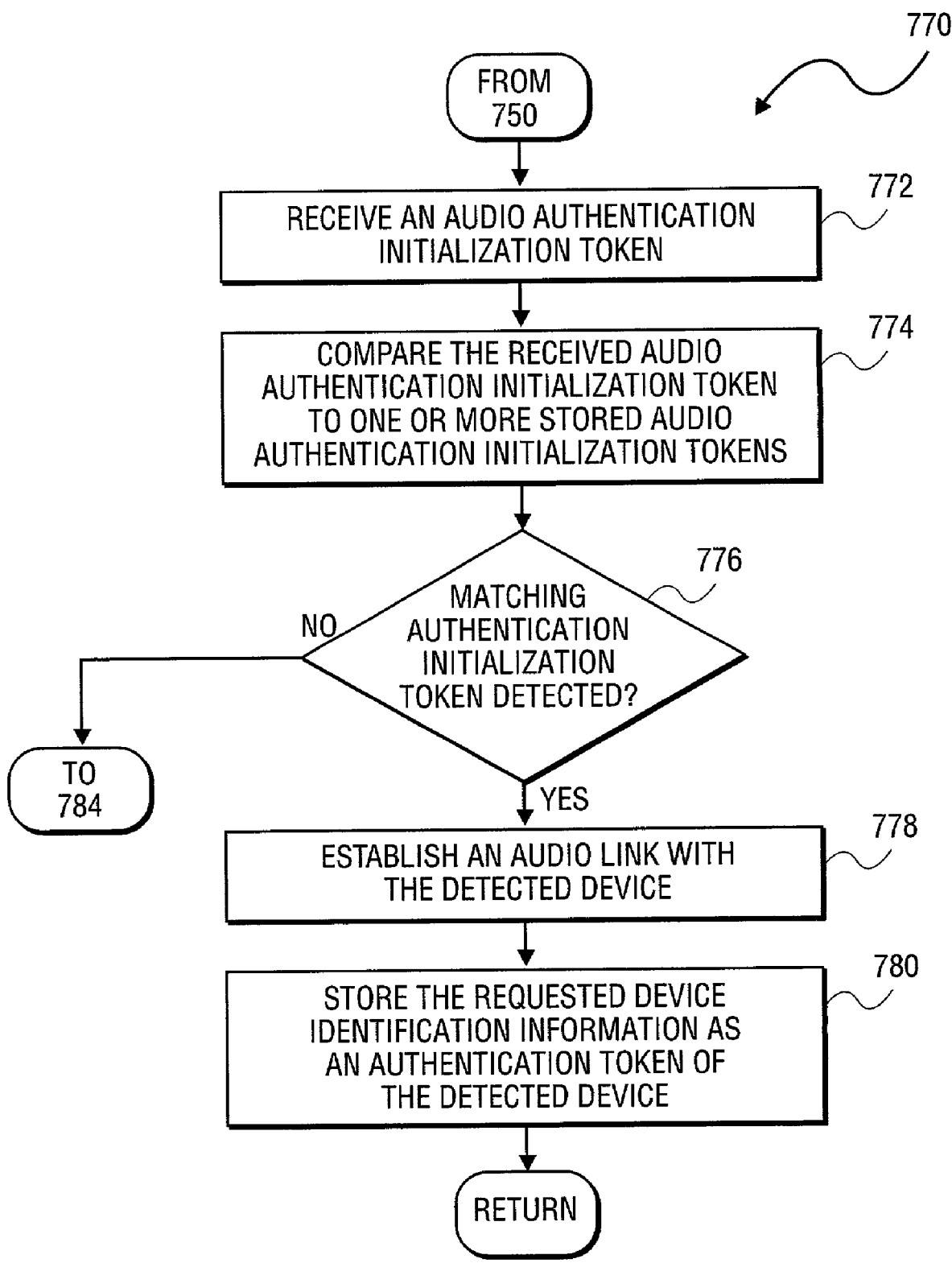
FIG. 13 depicts a flowchart illustrating an additional method for authenticating a detected device utilizing a requested audio authentication initialization token in accordance with an exemplary embodiment of the present invention.
Figure 14:
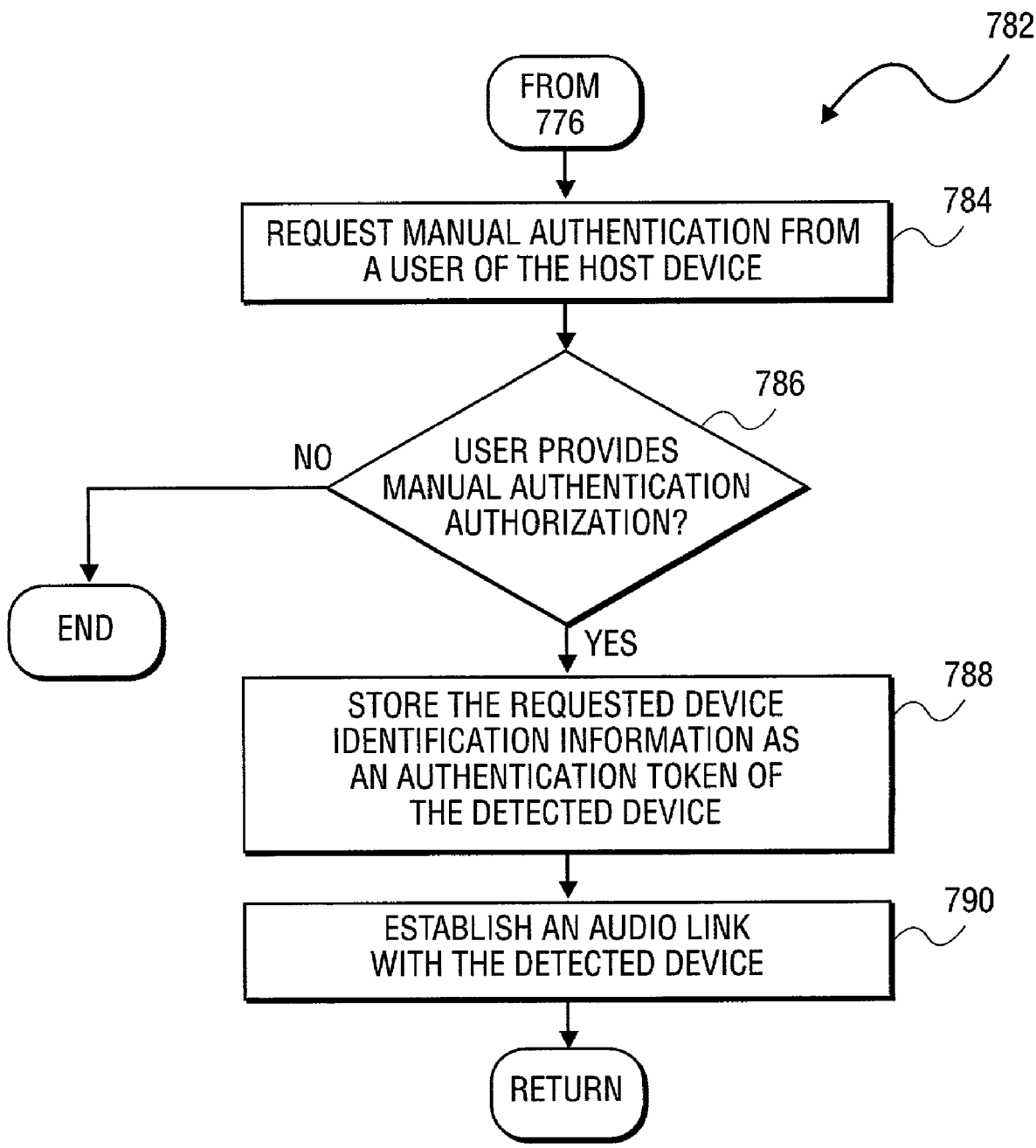
FIG. 14 depicts a flowchart illustrating an additional method for manual authentication of a detected device requiring user intervention in accordance with an exemplary embodiment of the present invention.

Referring now to FIG. 13, FIG. 13 depicts an additional method 770 for authenticating the detected device using the requested device authentication initialization information. At process block 772, the host device 200 receives an audio authentication initialization token. Once received, at process block 774, the host device 200 compares the received audio authentication initialization token to one or more stored audio authentication initialization tokens. Next, at process block 776, the host device 200 determines whether a matching authentication initialization token is detected. When a match is detected, at process block 778, the host device 200 establishes an audio link with the detected device 180. Otherwise, control flow branches to process block 784 of the method 782, as depicted in FIG. 14. Next, at process block 780, the host device stores the requested device identification information as an authentication token of the detected device. In one embodiment, the matching and comparisons are performed utilizing the device audio ID request procedures 234 and the audio ID verification procedures 236.

Referring now to FIG. 14, FIG. 14 depicts a method 782 for performing manual device authentication in accordance with one embodiment of the present invention. Accordingly, at process block 782, the host device 200 will request manual authentication from a user of the host device. Once requested, at process block 786, it is determined whether the user provides manual authentication authorization of the detected device 180. When authorization is received, control flow branches to process block 782. Otherwise, the process terminates. Accordingly, at process block 788, the host device 200 stores the requested device identification information as an authentication token of the detected device. Next, at process block 790, the host device establishes an audio link with the detected device.

Figure 15:
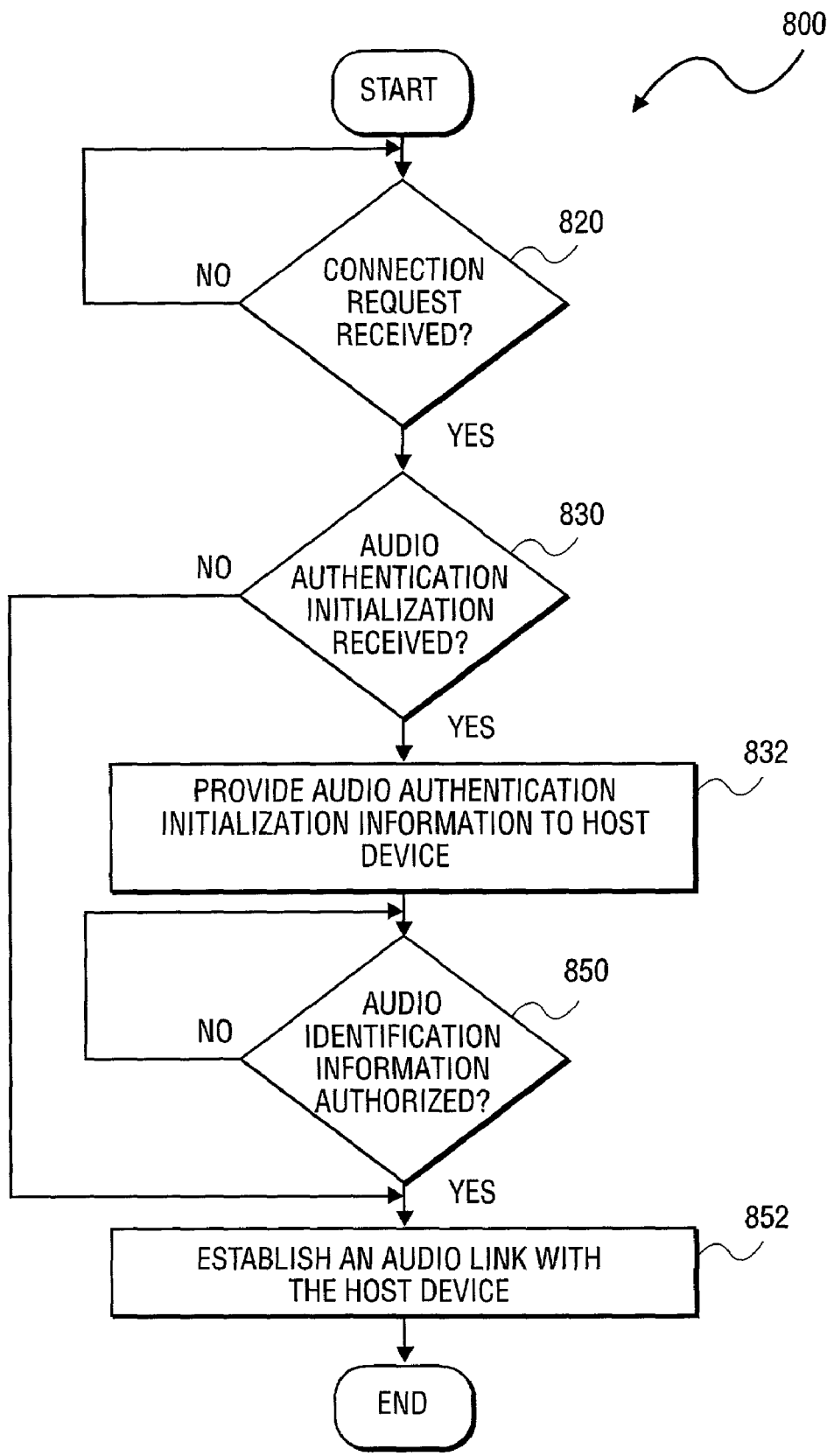
FIG. 15 depicts a flowchart illustrating a method for performing authentication initialization by a wireless device in accordance with one embodiment of the present invention.

Referring now to FIG. 15, FIG. 15 depicts a method performed by a detected wireless device 180 in response to an audio authentication initialization request. At process block 820, the wireless device 180 determines whether a connection request is received from, for example, host device 200, as depicted in FIG. 2A. Once a connection request is received, at process block 830, it is determined whether an audio authentication initialization request is received. When the request is received, at process block 840, the wireless device 180 provides audio authentication initialization information to the requesting host device. Once provided, at process block 850, it is determined whether the audio authentication initialization information is authorized by the host device 220. Once authorized, at process block 852, the wireless device 180 establishes an audio link with the host device 200. In one embodiment, method 800 is performed utilizing the link manager control driver procedures 194-199 of wireless slave devices 180, as depicted in FIG. 2B.

Figure 16:
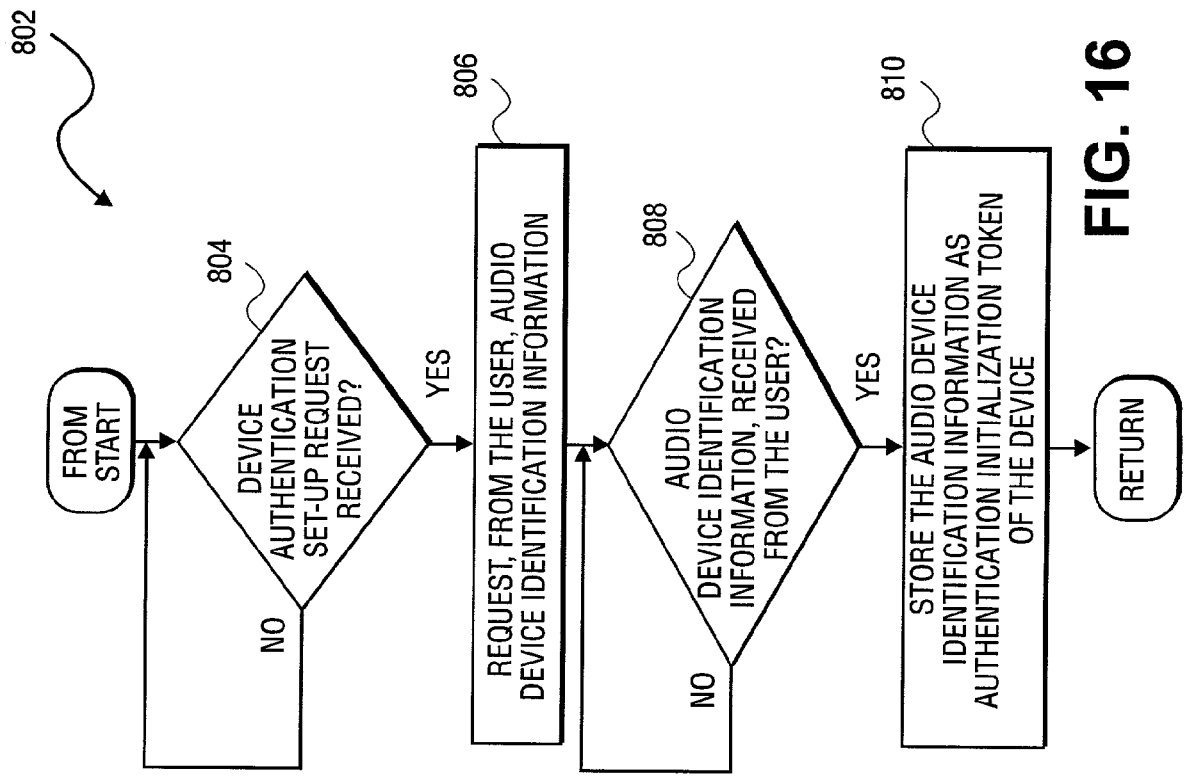
FIG. 16 depicts a flowchart illustrating an additional method for implementing device authentication set-up utilizing a voice stream device identification code in accordance with an exemplary embodiment of the present invention.

Referring now to FIG. 16, FIG. 16 depicts a method 802 for audio authentication set-up of a wireless slave device, utilizing for example, device audio authentication set-up procedures 190. At process block 804, it is determined whether a device authentication set-up request is received. In one embodiment, the request is automatically received during genesis boot of the wireless device 180. Next, at process block 806, the wireless device requests from the user a spoken or voice stream (audio) device name or device identification code (identification information). Next, at process block 808, it is determined whether the audio device identification information is received from the user. Once received, at process block 810, the wireless device 180 stores the audio device identification information as an authentication initialization token of the device 180. In one embodiment, as described above, the audio device identification information replaces an initialization key utilized according to the Bluetooth™ System Specification during initialization set-up of a communication link between a slave device and a host device.

Generally, as specified by the Bluetooth™ System Specification, generation of the initialization key requires user intervention via the wireless device MMI by entering a device ID code, as well as a device PIN code. As described above, this process must be repeated for each device which is to participate in a Bluetooth™ piconet and due to its non-intuitive nature, can become very cumbersome to a user. As a result, utilizing a user assigned voice stream or spoken device name or identification code as an authentication initialization token simplifies device set-up, as well as formation of, Bluetooth™ piconet. In one embodiment, interaction with the user is limited to the assigning of an audio device name or voice stream device identification code to each wireless device that is to participate in the Bluetooth™ piconet.

Figure 17:
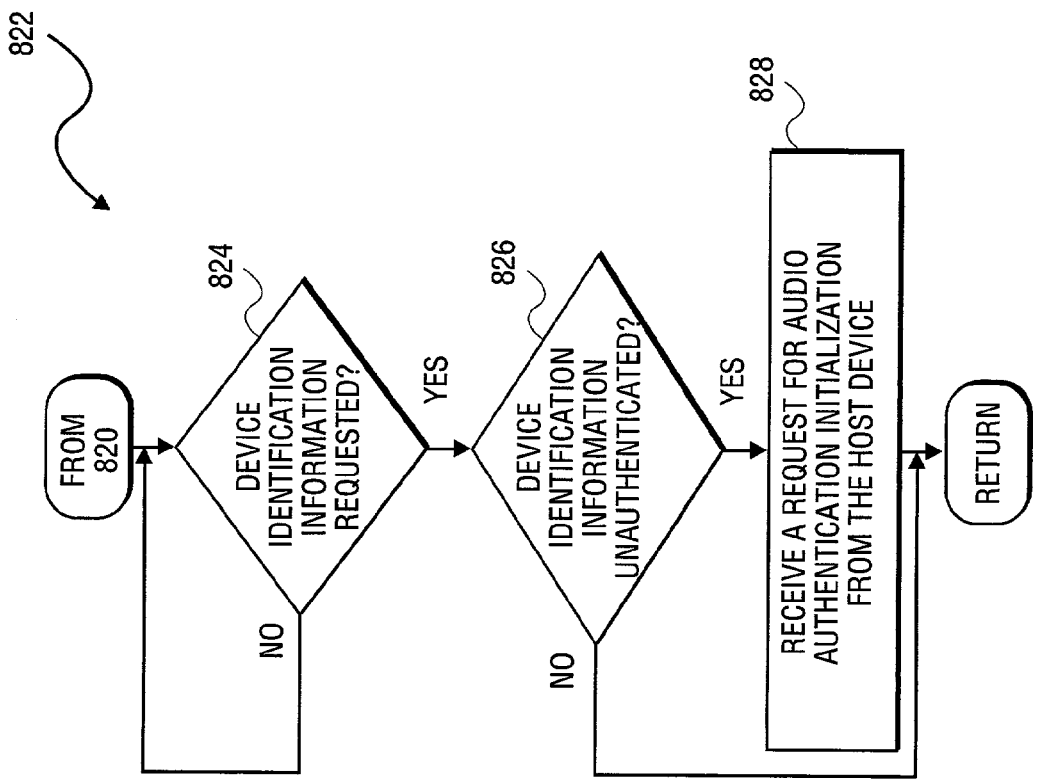
FIG. 17 depicts a flowchart illustrating an additional method for receiving a connection request from a host device following device detection in accordance with the further embodiment of the present invention.

Referring now to FIG. 17, FIG. 17 depicts an additional method 822 for determining whether an audio authentication initialization request is received. At process block 824, it is determined whether device identification information is requested from the wireless device 180. As described above, this process generally involves device authentication and a challenge response scheme to illustrate on the behalf of the wireless device, knowledge of an authentication key stored within the host device during device initialization. Next, at process block 826, it is determined whether the requested device identification information is authenticated by the host device 200. When audio authentication information is authenticated, an audio link is established between the host device 200 and the detected wireless device 180, as indicated at process block 852, as depicted in FIG. 15. Otherwise, at process block 828, the wireless device receives a request for audio authentication initialization information from the host device 200. In one embodiment, method 822 is performed utilizing the authentication reply procedures 196.

Figure 18:
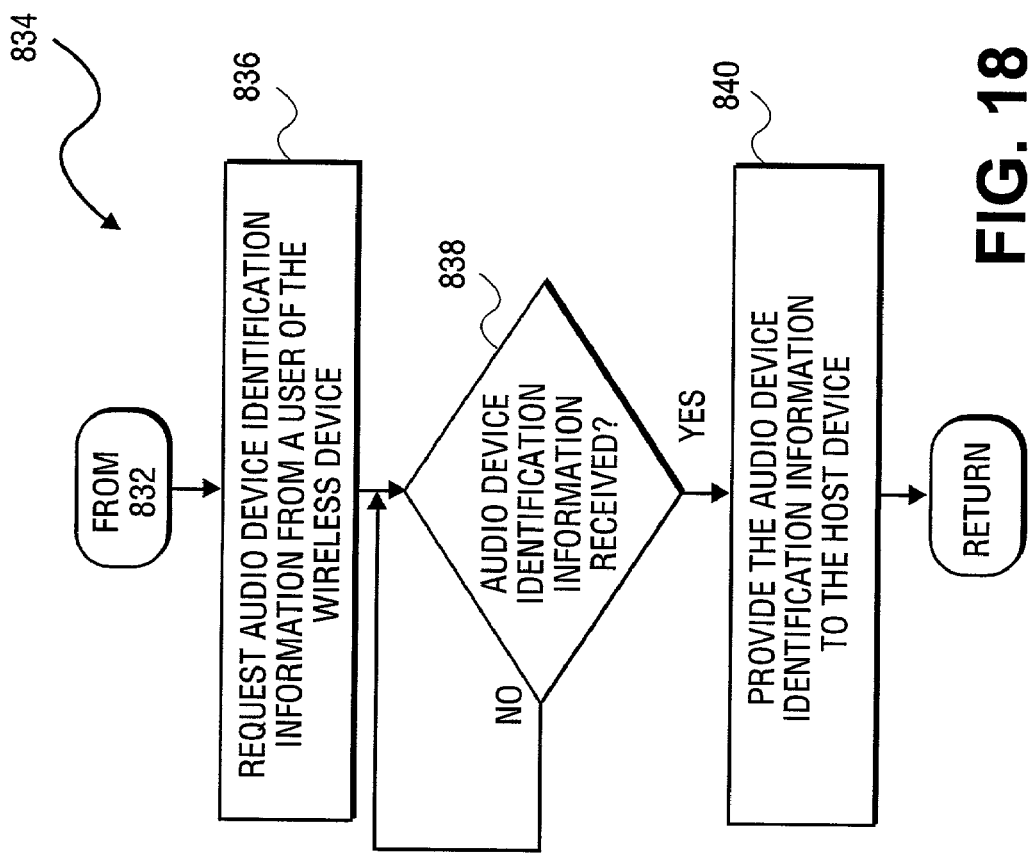
FIG. 18 depicts a flowchart illustrating an additional method for providing audio authentication initialization information to a host device during device authentication initialization in accordance with one embodiment of the present invention.

Referring now to FIG. 18, FIG. 18 depicts an additional method 834 for providing audio authentication initialization information to a requesting host device 200 at process block 832, as depicted in FIG. 15. At process block 836, the wireless device requests audio authentication initialization information from a user of the wireless device 180. Next, at process block 838, process block 836 is repeated until an audio device name or a voice stream device identification code is received from the user as the requested audio authentication initialization information. Once received, at process block 840, the wireless device provides the audio device identification information to the host device 200. In one embodiment, method 834 is performed utilizing the audio ID authentication reply procedures 198 and user interface procedures 199.

Figure 19:
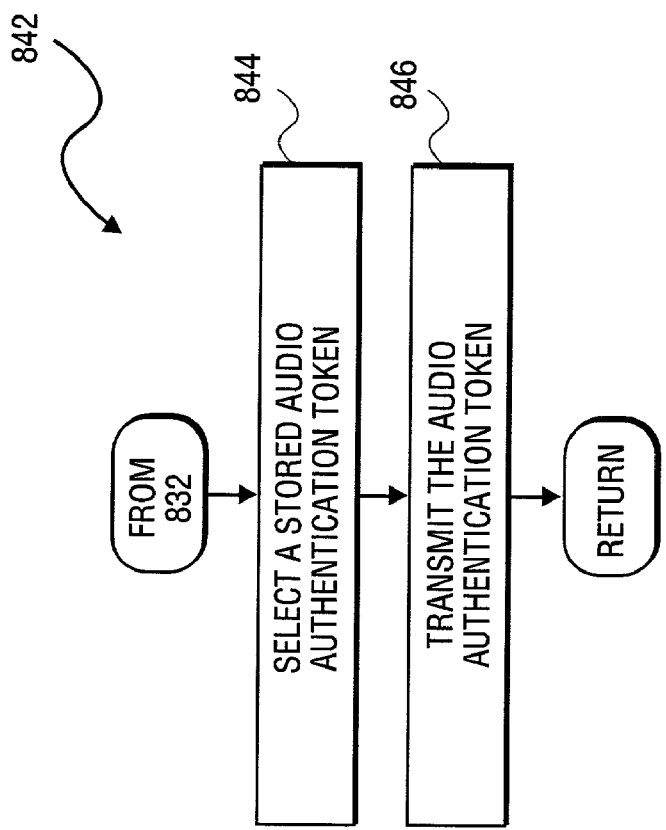
FIG. 19 depicts a flowchart illustrating an additional method for providing audio authentication initialization information to a host device during device authentication initialization in accordance with one embodiment of the present invention.

Finally, referring to FIG. 19, FIG. 19 depicts an alternate method 842 for providing audio authentication initialization information to a requesting host device 200 at process block 832 (FIG. 15). Accordingly, at process block 844, the wireless device selects a stored audio authentication initialization token. As described in an embodiment above, the audio authentication initialization token is provided by the user via the device audio authentication set-up procedures and functions as a substitute initialization key. In one embodiment, the audio authentication initialization token is a spoken device name or device identification code that is assigned by the device user during genesis boot of the device. Alternatively, the audio device identification information may be factory installed, thereby limiting the user to providing of the factory installed information to the host device for the authentication initialization process. Next, at process block 846, the devices transmits the audio authentication token to the requesting host device.

As described herein, the methods provide audio device authentication. This device authentication is provided by replacing traditional device initialization as described by the Bluetooth™ System Specification. In one embodiment, the replacement is the use of an audio or voice stream device name as an identification code assigned to a wireless device during genesis boot of the wireless device. Once assigned, the user provides the audio device identification information to a host device of a Bluetooth™ piconet in which the wireless slave device will participate. As such, the audio device identification information is utilized as an initialization key, which is required in order to exchange link or authentication keys between slave devices and host devices in order to enable subsequent device authentication.

Consequently, utilizing the embodiments of the present invention, a device user is spared the task of entering device identification information, as well as device PIN codes, for each device that the user desires to participate in the piconet hosted by the master device. In other words, by simply using the audio device name assigned by the user, voice identification software running on the host device can authenticate the audio device name and provide for exchange of authentication keys between the devices utilizing the audio device name for initial security verification.

Alternate Embodiments

Several aspects of one implementation of the wireless device authentication utilizing audio stream authentication information have been described. However, various implementations of the audio stream authentication system provide numerous features including, complementing, supplementing, and/or replacing the features described above. Features can be implemented as part of a host device or as part of the various slave devices in different implementations. In addition, the foregoing description, for purposes of explanation, used specific nomenclature to provide a thorough understanding of the embodiments of the invention. However, it will be apparent to one skilled in the art that the specific details are not required in order to practice the invention.

In addition, although an embodiment described herein is directed to an authentication system utilizing a voice stream identification code assigned to a device during initialization set-up, it will be appreciated by those skilled in the art that the embodiment of the present invention can be applied to other systems. In fact, systems for wireless device authentication using audio authentication are within the embodiments of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

The embodiments of the present invention provides many advantages over known techniques. In one embodiment, the present invention includes the ability to spare users the cumbersome task of wading through a myriad of device set-up procedures in order to establish a first time communications connection with a host device. As such, the embodiments of the present invention enables the user to enter and assign a voice ID or name to a respective device, which is initially stored by a host device. In addition, the voice code identification is stored within the respective device. As such, during initial audio link set-up with the host device, the device can simply provide the voice identification code to the host device, which is authorized, when compared to a matching stored voice stream ID.

As a result, using a human voice spoken device as an authentication initialization token along with corresponding software, makes device authentication easier by performing the device authentication via software where set-up is straightforward. Accordingly, the authentication process is provided via voice and speech recognition algorithms within the real time operating system environment for the host device by comparing a stored voice stream ID to a received voice stream ID sent across the link to provide an authentication initialization match. Simple stream comparison algorithms can be done using processing power of the host device or this can be done within the device, itself. Accordingly, authentication or link keys generated by the various device can then be exchanged to enable subsequent device authentication in accordance with the Bluetooth™ System Specification.

Having disclosed exemplary embodiments and the best mode, modifications and variations may be made to the disclosed embodiments while remaining within the scope of the invention as defined by the following claims.

What is claimed is:

1. A method comprising:
    detecting a wireless device within communication range of a host device;
    authenticating, by a host device, the detected wireless device according to requested device identification information of the detected wireless device;
    if the detected wireless device fails authentication, requesting audio authentication initialization information from the detected wireless device;
    authenticating, by the host device, the detected wireless device based on the requested audio authentication initialization information received from the detected wireless device and audio authentication initialization information stored by the host device for initial authentication of the detected wireless device; and
    storing, by the host device, one or more of a device identification code and a device personal identification number of the detected wireless device as device identification information to enable subsequent authentication of the detected wireless device.

2. The method of claim 1, wherein prior to detecting the wireless device, the method further comprises:
    receiving an audio device authentication set-up request from a user of a wireless device;
    requesting audio device identification information for the detected wireless device;
    receiving the audio device identification information from the detected device; and
    storing the received audio device identification information as an authentication initialization token for the detected wireless device.

3. The method of claim 2, further comprising:
    storing the authentication initialization token within the detected wireless device.

4. The method of claim 2, wherein storing further comprises:
    compressing the received audio device identification information; and
    generating a hash value of the compressed audio device identification information to form the authentication initialization token of the detected wireless device.

5. The method of claim 1, wherein, detecting the wireless device further comprises:
    polling a surrounding area of the host device for audio sources within a pre-determined distance of the host device; and
    when an audio source is detected, initiating an authentication handshake with an audio source device of the detected audio source.

6. The method of claim 1, wherein authenticating the detected device according to requested device identification information, further comprises:
    requesting the device identification information from the detected wireless device;
    comparing the requested device identification information with stored device authentication information within the host device;
    when matching device authentication information is found, establishing an audio link with the detected wireless device; and
    otherwise, initiating a request for audio authentication initialization information of the detected wireless device.

7. The method of claim 1, wherein authenticating the detected wireless device based on the requested audio authentication information further comprises:
    receiving audio device identification information as the requested audio authentication initialization information;
    compressing the received audio device identification information;

generating a hash value of the compressed audio device identification information to form a requested device authentication initialization token;

comparing the requested device authentication initialization token to one or more stored device authentication initialization tokens; and when a matching stored authentication initialization token is detected, storing the requested device identification information of the detected wireless device as a device authentication token.

8. The method of claim 1, wherein authenticating the detected device based on the requested audio authentication information further comprises:

receiving an audio authentication token as the requested audio authentication information of the detected wireless device;

comparing the received audio authentication token to one or more stored audio authentication tokens;

when a matching stored audio authentication token is detected, establishing an audio link with the detected wireless device; and storing the requested device identification information as a device authentication token of the detected wireless device.

9. The method of claim 8, further comprising:

otherwise, requesting manual authorization from a user of the host device to authenticate the detected wireless device;

when the user provides manual authentication authorization, storing the requested device identification information as a device authentication token of the detected wireless device; and establishing an audio link between the detected wireless device and the host device.

10. The method of claim 1, wherein authenticating the detected wireless device according to the requested device identification information, further comprises:

requesting an authentication token from the detected wireless device; and receiving an authentication key as the requested authentication token.

11. A computer readable storage medium including program instructions that direct a computer to function in a specified manner when executed by a processor, the program instructions comprising:

detecting a wireless device within communication range of a host device;

authenticating, by the host device, the detected wireless device according to requested device identification information of the detected wireless device;

if the detected wireless device fails authentication, requesting audio authentication initialization information from the wireless detected device;

authenticating, by the host device, the detected device based on the requested audio authentication initialization information received from the detected wireless device and audio authentication initialization information stored by the host device for initial authentication of the detected wireless device; and storing, by the host device, one or more of a device identification code and a device personal identification number of the detected wireless device as device identification information to enable a challenge and response scheme for subsequent authentication of the detected wireless device.

12. The computer readable storage medium of claim 11, wherein prior to detecting the wireless device, the method further comprises:

receiving an audio device authentication set-up request from a user of the detected wireless device;

requesting audio device identification information for the detected wireless device;

receiving the audio device identification information from the detected wireless device; and storing the received audio device identification information as an authentication initialization token for the detected wireless device.

13. The computer readable storage medium of claim 12, further comprising:

storing the authentication initialization token within the detected wireless device.

14. The computer readable storage medium of claim 12, wherein storing further comprises:

compressing the received audio device identification information; and generating a hash value of the compressed audio device identification information to form the authentication initialization token of the wireless device.

15. The computer readable storage medium of claim 11, wherein detecting the wireless device, further comprises:

polling a surrounding area of the host device for audio sources within a pre-determined distance of the host device; and when an audio source is detected, initiating an authentication handshake with an audio source device of the detected audio source.

16. The computer readable storage medium of claim 11, wherein authenticating the detected wireless device according to the requested device identification information, further comprises:

requesting the device identification information from the detected wireless device;

comparing the requested device identification information with stored device authentication information within the host device;

when matching device identification information is found, establishing an audio link with the detected wireless device; and otherwise, initiating a request for audio authentication initialization information of the detected wireless device.

17. The computer readable storage medium of claim 11, wherein authenticating the detected device based on the requested audio authentication information further comprises:

receiving an audio device identification information as the requested audio identification information;

compressing the received audio identification information;

generating a hash value of the compressed audio device identification information to form a requested device authentication initialization token;

comparing the requested device authentication initialization token to one or more stored device authentication initialization tokens; and when a matching device authentication initialization token is detected, storing the requested device identification information as a device authentication token of the detected wireless device.

18. The computer readable storage medium of claim 11, wherein authenticating the detected device based on the requested audio authentication information further comprises:
  receiving an audio authentication token as the requested audio identification information of the detected wireless device;
  comparing the received audio authentication token to one or more stored audio authentication tokens;
  when a matching stored audio authentication token is detected, establishing an audio link with the detected wireless device; and
  storing the requested device identification information as a device authentication token of the detected wireless devices.

19. The computer readable storage medium of claim 18, further comprising:
  otherwise, requesting manual authorization from a user of the host device to authenticate the detected wireless device;
  when the user provides manual authentication authorization, storing the requested device identification information of the detected wireless device; and
  establishing an audio link between the detected wireless device and the host device.

20. The computer readable storage medium of claim 11, wherein authenticating the device according to the requested device identification information, further comprises:
  requesting authentication information from the detected wireless device; and
  receiving an authentication key from the detected wireless device as the requested authentication information.

21. A method comprising:
  receiving, by a wireless device, a communications connection request from a host device;
  engaging in a challenge and response scheme with the host device according to authentication information held by the wireless device to enable the host device to authenticate the wireless device;
  if a request for audio authentication initialization information is received from the host device, providing audio authentication initialization information to the host device; and
  once the provided audio authentication initialization information is authenticated by the host device according to audio authentication initialization information stored by the host device for initial authentication of the wireless device, providing the host device with one or more of a device identification code and a device personal identification number of the wireless device as device identification information to enable subsequent authentication of the wireless device.

22. The method of claim 21, wherein engaging in the challenge and response scheme authentication further comprises:
  receiving a request for authentication information of the wireless device;
  providing the requested authentication information to the host device; and
  when the requested authentication information of the wireless device is not authenticated by the host device, receiving a request for audio authentication initialization information of the wireless device.

23. The method of claim 22 wherein providing audio authentication initialization information to the host device further comprises:
  requesting audio authentication initialization information from a user of the wireless device;
  receiving audio device identification information from the user as the authentication initialization information; and
  providing the audio device identification information to the host device as the requested audio authentication initialization information.

24. The method of claim 22, further comprising:
  selecting a stored audio authentication initialization token; and
  transmitting the audio authentication initialization token to the host device.

25. The method of claim 21, wherein prior to receiving the connection request, the method further comprises:
  receiving a device authentication set-up request from a user of the wireless device;
  requesting, from the user, audio device identification information as audio authentication initialization information of the wireless device; and
  once the audio device identification information is received from the user, storing the voice audio device identification information as an audio authentication initialization token of the wireless device.

26. A computer readable storage medium including program instructions that direct a computer to function in a specified manner when executed by a processor, the program instructions comprising:
  receiving, by a wireless device, a connection request from a host device;
  engaging in a challenge and response scheme with the host device according to authentication information held by the wireless device to enable the host device to authenticate the wireless device;
  if a request for audio authentication initialization information is received from the host device, providing audio authentication initialization information to the host device; and
  once the provided audio authentication initialization information is authenticated by the host device according to audio authentication initialization information stored by the host device for initial authentication of the detected wireless device, providing the host device with one or more of a device identification code and a device personal identification number of the wireless device as device identification information to enable subsequent authentication of the wireless device.

27. The computer readable storage medium of claim 26, wherein engaging in the challenge and response scheme authentication further comprises:
  receiving a request for device identification information of the wireless device;
  providing the requested device identification to the host device; and
  when the requested authentication information of the wireless device is not authenticated by the host device, receiving a request for audio authentication initialization information of the wireless device.

28. The computer readable storage medium of claim 26, wherein providing audio authentication initialization information to the host device further comprises:
  requesting audio authentication initialization information from a user of the wireless device;
  receiving audio device identification information from the user as the authentication initialization information of the detected wireless device; and providing the audio device identification information to the host device as the requested audio authentication initialization information.

29. The computer readable storage medium of claim 27, further comprising:
selecting a stored audio authentication initialization token; and
transmitting the audio authentication initialization token to the host device.

30. The computer readable storage medium of claim 26, wherein prior to receiving the connection request, the method further comprises:
receiving a device initialization request from a user of the wireless device;
requesting, from the user, audio device identification information as audio authentication initialization identification information of the wireless device; and
once the audio device identification information of the wireless device is received, storing the audio device identification information as an authentication initialization token of the wireless device.

31. An apparatus, comprising:
an authentication unit to authenticate at least one wireless device detected within communications range of the apparatus using stored audio authentication initialization information for initial authentication of the detected wireless device if a challenge and response scheme for authentication according to device identification information of the detected wireless device fails to authenticate the detected wireless device;
a communications interface coupled to the authentication unit, the communications interface to establish an audio link with the authenticated wireless device, request device identification information as well as audio device authentication initialization information from the detected wireless device; and
a storage device coupled to the authentication unit, containing an audio authentication initialization token as well as one or more of a device identification code and a device personal identification number as device identification information for at least one wireless device initialized by the apparatus to enable subsequent authentication of the initialized wireless device.

32. The apparatus of claim 31, further comprising:
a device initialization unit to request audio device identification information in response to a device authentication set-up request from a user of a wireless device and store the received audio device identification information as an authentication initialization token of the wireless device.

33. The apparatus of claim 31, wherein the authentication unit compares a received audio authentication initialization token to one or more stored audio authentication initialization tokens, establishes an audio link with a detected wireless device when a matching stored audio authentication initialization token is detected, and stores requested device identification information of the detected wireless device as an authentication key.

34. A system comprising:
a host device; and
at least one wireless device, the wireless device including:
a processor having circuitry to execute instructions; and
a storage device having a sequence of instructions stored therein, which when executed by the processor causes the processor to:
engage in a challenge and response scheme with the host device according to device identification information held by the wireless device to enable the host device to authenticate the wireless device;
request an audio authentication initialization information from a user of the wireless device if an audio authentication initialization request is received from the host device;
receive audio device identification information from the user;
provide the audio device identification information to the host device as the requested audio authentication initialization information; and
once the provided audio authentication initialization information is authenticated by the host device according to audio authentication initialization information stored by the host device for initial authentication of the detected wireless device, providing the host device with one or more of a device identification code and a device personal identification number of the wireless device as device identification information to enable subsequent authentication of the wireless device.

35. The system of claim 34, wherein the host device further comprises:
an authentication unit to authenticate wireless devices detected within communications range of the host device using audio authentication information of the detected wireless devices;
a communications interface coupled to the authentication unit, the communications interface to establish audio links with authenticated wireless devices, request device identification information as well as audio authentication initialization information from detected wireless devices; and
a storage device coupled to the authenticating unit, containing an audio authentication initialization tokens as well as device identification information for each wireless device initialized by the host device.

36. The system of claim 34, wherein the host device further comprises:
a device initialization unit to request an audio device identification in response to a device authentication set-up request from a user of a wireless device and store received audio device identification information as an authentication initialization token for the wireless device.

* * * * *

UNITED STATES PATENT AND TRADEMARK OFFICE
CERTIFICATE OF CORRECTION

PATENT NO. : 7,254,708 B2
APPLICATION NO. : 10/092401
DATED : August 7, 2007
INVENTOR(S) : Silverster Page 1 of 1

It is certified that error appears in the above-identified patent and that said Letters Patent is hereby corrected as shown below:

Column 2, at line 16, delete "set-audio" and insert --set-up and authentication utilizing audio--.

Signed and Sealed this

Seventeenth Day of June, 2008

JON W. DUDAS
*Director of the United States Patent and Trademark Office*